(12) United States Patent
Washbourne et al.

(10) Patent No.: US 6,388,947 B1
(45) Date of Patent: May 14, 2002

(54) MULTI-CROSSWELL PROFILE 3D IMAGING AND METHOD

(75) Inventors: John K. Washbourne, Houston, TX (US); James W. Rector, III, Kensington, CA (US); Kenneth P. Bube, Seattle, WA (US)

(73) Assignee: TomoSeis, Inc., Houston, TX (US)

( * ) Notice: Subject to any disclaimer, the term of this patent is extended or adjusted under 35 U.S.C. 154(b) by 0 days.

(21) Appl. No.: 09/152,935

(22) Filed: Sep. 14, 1998

(51) Int. Cl.$^7$ .................................................. G01V 1/13
(52) U.S. Cl. ........................................ 367/73; 367/38
(58) Field of Search .............................. 367/34, 57, 72, 367/32, 14, 16, 25, 273, 38, 59, 35, 30, 69; 702/6, 14, 16, 7; 364/422; 524/335

(56) References Cited

U.S. PATENT DOCUMENTS

| | | | |
|---|---|---|---|
| 5,144,590 A | | 9/1992 | Chon |
| 5,481,501 A | * | 1/1996 | Blakeslee et al. .............. 367/57 |
| 5,583,826 A | * | 12/1996 | Soubaras ...................... 367/44 |
| 5,586,082 A | * | 12/1996 | Anderson et al. ............. 367/73 |
| 5,691,958 A | * | 11/1997 | Calvert et al. ................. 367/73 |

OTHER PUBLICATIONS

W. Scott Phillips and Michael C. Fehler, Traveltime Tomography: A comparison of popular methods, Oct. 1991, Geophysics, vol. 56, No. 10.

Jean Luc Guiziou, Jean Laurent Mallet, and Raul Madariaga, 3–D seismic reflection tomography on top of the COCAD depth modeler, Sep. 1996, Geophysics, vol. 61, No. 5.

Stephen K.L. Chiu and Robert R. Stewart, Tomographic determination of three–dimensional seismic velocity structure using well logs, vertical seismic profiles, and surface seismic data, Aug. 1987, Geophysics, vol. 52, No. 8.

Kris A. Dines and R. Jeffrey Lytle, Computerized Geophysical Tomography, Jul. 1979, Proceedings of the IEEE, vol. 67, No. 7.

John A. Scales, Tomographic inversion via the conjugate gradient method, Feb. 1987, Geophysics, vol. 52, No. 2.

(List continued on next page.)

Primary Examiner—Glenn W. Brown
Assistant Examiner—Anthony Jolly
(74) Attorney, Agent, or Firm—Michael Pritzkau

(57) ABSTRACT

Characterizing the value of a particular property, for example, seismic velocity, of a subsurface region of ground is described. In one aspect, the value of the particular property is represented using at least one continuous analytic function such as a Chebychev polynomial. The seismic data may include data derived from at least one crosswell dataset for the subsurface region of interest and may also include other data. In either instance, data may simultaneously be used from a first crosswell dataset in conjunction with one or more other crosswell datasets and/or with the other data. In another aspect, the value of the property is characterized in three dimensions throughout the region of interest using crosswell and/or other data. In still another aspect, crosswell datasets for highly deviated or horizontal boreholes are inherently useful. The method is performed, in part, by fitting a set of vertically spaced layer boundaries, represented by an analytic function such as a Chebychev polynomial, within and across the region encompassing the boreholes such that a series of layers is defined between the layer boundaries. Initial values of the particular property are then established between the layer boundaries and across the subterranean region using a series of continuous analytic functions. The continuous analytic functions are then adjusted to more closely match the value of the particular property across the subterranean region of ground to determine the value of the particular property for any selected point within the region.

92 Claims, 13 Drawing Sheets

OTHER PUBLICATIONS

John A. Scales, Paul Docherty, and Adam Gersztenkorn, Regularizaton of nonlinear inverse problems: imaging the near–surface weathering layer, 1990, Inverse Problems, 6.

A. Gersztenkorn and J. A. Scales, Smoothing seismic tomograms with alpha–trimmed means, 1988, Geophysical Journal, 92.

Keith A. Meyerholtz, Gary L. Pavlis, and Sally A. Szpakowski, Convolution quelling in seismic tomography, May 1989, Geophysics, vol. 54, No. 5.

* cited by examiner

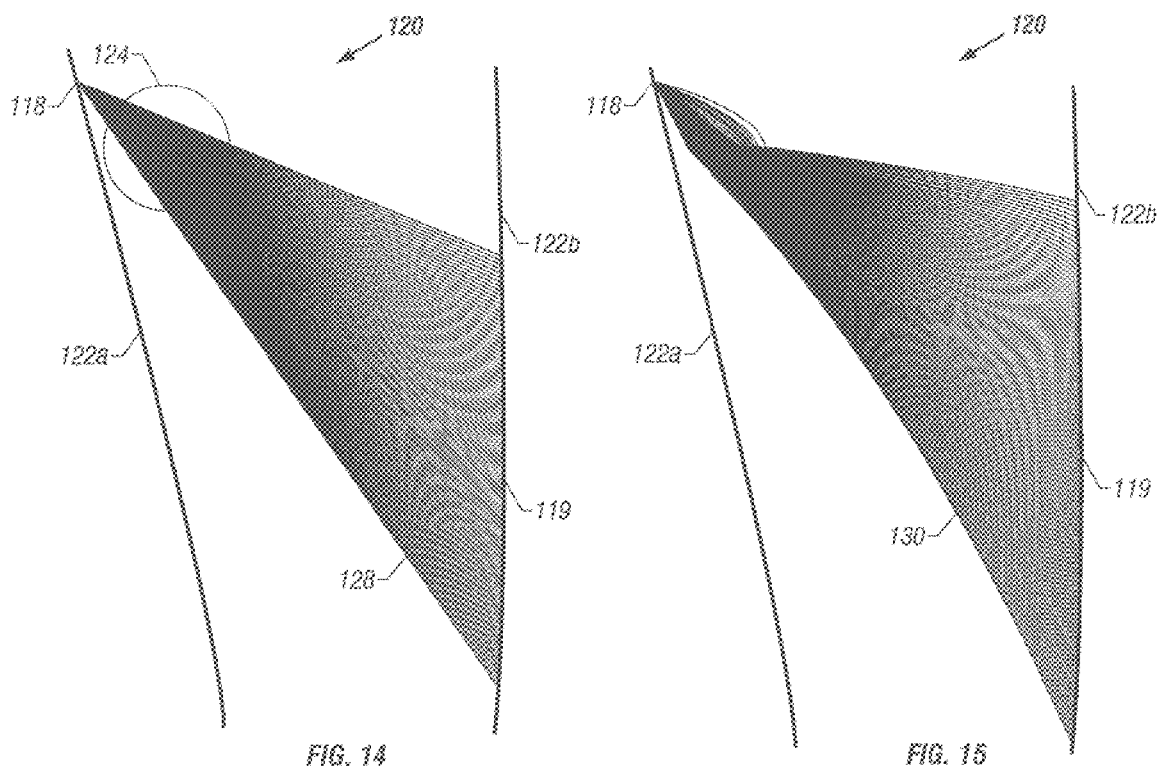

MULTI-CROSSWELL PROFILE 3D IMAGING AND METHOD

GOVERNMENT CONTRACT CLAUSE

This invention was made with Government support under STTR GRANT No. DE-FG02-94ER86019 awarded by the Department of Energy. The Government has certain rights in this invention.

The present invention relates generally to crosswell seismic mapping or imaging and more particularly to a method for producing high quality three dimensional mapping or imaging using at least one crosswell data profile in combination with other downhole derived data which may include one or more other crosswell data profiles.

In the field of geophysics, the knowledge of the subsurface structure of the ground is useful, for example, in the extraction of mineral resources such as oil and natural gas. In the past, a number of different seismic imaging methods, including tomographic methods and reflectance imaging methods, have been implemented with the goal of rendering images which impart such knowledge of the subsurface geologic structure. With regard to an oil or gas reservoir, the availability of an accurate prior art seismic image, as interpreted by a geoscientist reasonably versed in its use, can provide the capability to extract additional production from a reservoir than would otherwise be possible. Thus, in view of the earth's limited resources and the expense encountered in recovery of such resources, prior art seismic imaging has become increasingly important.

One area of particular importance with regard to prior art seismic methods is that of crosswell seismic imaging. Conventional crosswell seismic imaging typically utilizes a pair of boreholes in proximity to the reservoir. In the first of these boreholes, a seismic source is deployed for emitting seismic energy into the region of interest, often as a swept frequency signal (chirp) which covers a predetermined frequency range. The source is selectively moved between a series of positions within the first borehole at predetermined times. The seismic energy passes through and around the subterranean region of interest to the second one of the pair of boreholes. A receiver array is typically deployed within the second borehole and, like the seismic source, the receiver array is moveable between a series of positions within the second borehole. It should be appreciated that the subterranean region of interest may comprise a zone which is at a known or estimated depth range below the surface. In this case, the receiver array and source positions are adjusted accordingly such that the positions are spaced across the zone of interest rather than extending all the way to the surface. By transmitting from each source position in the first borehole while receiving data at each and every receiver array position in the second borehole, a seismic crosswell dataset is generated. Crosswell seismic datasets typically offer advantages in resolution over surface seismic datasets which are more commonly practiced.

After having generated a seismic dataset, the task of using the dataset to produce a crosswell image or tomogram may be undertaken. In this regard, it should be appreciated that the crosswell seismic dataset comprises a large, complex set of information which is rich in detail relating to the geologic structure and material properties of the subterranean region of interest. Due to this complexity, certain known types of data such as, for example, direct arrival traveltimes are generally obtained from the profile and utilized iteratively in a mathematical model of the subterranean region to establish the geologic structure and material properties within some approximation. While a number of effective methods for generating models have been developed in the prior art, it should be appreciated that most conventional crosswell imaging is limited to producing a two dimensional tomogram in the plane defined between two generally vertically extending boreholes. The usefulness of even a two dimensional high resolution tomogram depicting a "slice" of the subterranean region between a pair of boreholes is not diminished by the teachings and discoveries disclosed herein. However, these discoveries in conjunction with other recent developments in the prior art are thought to provide sweeping improvements.

One recent development relates to the practical acquisition of individual crosswell datasets. In the past, data was collected between a pair of boreholes in the manner described above. The collection of even one crosswell dataset was prohibitively expensive, at least in part due to relatively inefficient methods. More recently, however, improvements in data acquisition technology have been made which have dramatically increased data collection efficiency between a pair of boreholes. Such improvements include, for example, stronger sources, shooting "on-the-fly" and the use of multilevel receiver strings. Based on improved collection efficiency alone, the amount of data which may be collected in a single day has increased by a factor of at least ten. Such a dramatic improvement makes crosswell seismic even more attractive and opens the potential for crosswell surveys over large areas of existing and prospective reservoirs. Of course, the advantages of crosswell seismic such as, for example, high resolution (on the order of well log resolution) remain attendant to its use. However, there remains a need for a corresponding improvement in the all important image generating process for dealing in an effective way with this vast increase in the amount of available data, particularly in the instance where a number of crosswell datasets are available for a single field or reservoir. This need as well as other needs for improvement will be discussed in further detail below.

A number of crosswell datasets may be available for a particular reservoir or region for two reasons. First, the datasets may be obtained in the conventional manner between pairs of boreholes across the region. Second, using more recent data acquisition technology, crosswell data surveys may now be conducted across a region penetrated by a plurality of boreholes by deploying a source in one of the boreholes and deploying receiver strings in each of the remaining boreholes so as to simultaneously record the output of the source to at once provide a plurality of datasets. In this regard, one of the more telling limitations of current crosswell technology resides in the fact that conventional crosswell technology provides only the capability to use each dataset apart from the other datasets to generate a two dimensional image. That is, the geoscientist is presented with a plurality of independent, two dimensional images, one for each dataset. In most practical cases, two dimensional planar images are an approximate depiction of the true complex, three dimensional earth structure. Unfortunately, a more detailed limitation has been observed in this regard to the extent that intersecting planar images produced between different pairs of boreholes in the same region commonly exhibit inconsistencies at intersection points of the two images so as to present a dilemma as to the actual structure. Presently, the only solution to this dilemma has been found in questionably effective techniques such as interpolation. Applicants are not aware of any effective prior art technique for producing a uniform image across a region in view of a plurality of independently generated crosswell seismic planar images, irrespective of the fact that the datasets resulting in the images may even have been obtained simultaneously.

Still another and practically significant limitation of conventional crosswell seismic imaging is found in situations where boreholes from which a crosswell dataset is generated exhibit significant deviation from the vertical direction. One inherent assumption of conventional crosswell imaging is that of producing an image of the plane defined between a pair of vertically extending boreholes. Unfortunately, this assumption is problematic in instances of significant borehole deviation. In the past, correction schemes have been introduced in an attempt to compensate for such deviation. However, there remains a need for a more effective solution. Similarly, conventional crosswell imaging assumes generally two dimensional earth structure with limited geological complexity. Where these assumptions are not valid, the planar images will be erroneous. Therefore, the need remains for improvement in capability for use in regions which exhibit complex geologic structure including, for example, high velocity contrasts and/or significant out of plane dip.

Prior art crosswell seismic imaging has drawn, at least in part, from the arts of surface seismic and surface to borehole seismic techniques. Consistent with this background, most practical and proposed methods for imaging from crosswell data are based on conventional, pixelized, model representation. Unfortunately, pixelized model representations, whilst highly flexible in the limit, generally rely on numerical methods for processing and become computationally inefficient and even impractical as model resolution and complexity are increased. Specific methods with advantages for crosswell imaging, particularly tomographic and inversion methods, as well as schemes for analytical representation of seismic model parameters, are well described in the literature, as listed below:

Phillips, W. S. and Fehler, M. C., 1991, Traveltime tomography: A comparison of popular methods: Geophysics, 56, no. 10, 1639–1649.

Guiziou, J. L., Mallet, J. L. and Madariaga, R., 1996, 3-D seismic reflection tomography on top of the GOCAD depth modeler: 61, 5, no. 1, 1499–1510.

Chiu, S. K. L., and Stewart, R. R., 1987, Tomographic determination of three-dimensional seismic velocity structure using well logs, vertical seismic profiles, and surface seismic data, Geophysics, 52, 8, 1085–1098.

Dynes and Lytle, 1979, Computerized geophysical tomography, Proc IEE, 67,1065– 1073.

Scales, J., 1987, Tomographic inversion via the conjugate gradient method, Geophysics, 52,179–185.

Scales, J., Doherty, P., and Gerztenkorn, A., 1990, Regularisation of nonlinear inverse problems: imaging the near surface weathering layer: Inverse Prob, 6, 115–131.

Gerskentorn, A., and Scales, J., 1987, Smooting seismic tomograms with alpha-trimmed means: Geophys. J. R. Astron. Soc., 91, 67–72.

Meyerholtz, K. A., Pavlis, G. L., and Szpanowski, S. A., 1989, Convolutional quelling in seismic tomography, Geophysics, 54, 570–580.

Therefore, direct comparisons will be made at appropriate points below between the present invention and the 'state-of-the-art' in crosswell traveltime tomography serving to point out significant differences which ultimately relate to the advantages attendant to the use of the present invention.

The principal methods of prior art crosswell traveltime tomography are outlined in Phillips and Fehler (1991) and include:

Damped least squares or iterative backprojection (Dynes and Lytle, 1979).

Damped least squares with smoothing (Gersztenkorn and Scales, 1987).

Damped least squares with convolutional quelling (Meyerholz, et al, 1989).

Regularized inversion (Scales, et al, 1990).

Iteratively reweighted least squares (Scales, et al, 1988).

It is noted for later reference that all of these principal methods utilize iterative backprojection through a slowness model, and therefore are subject to the constraints and limitations of the crosswell aperture (Rector and Washbourne, 1994) and the resolution limits imposed by ray tomography (Williamson and Worthington, 1984).

Attention is now directed to FIGS. 1–3 for purposes of providing an actual example illustrating still other limitations of prior art crosswell seismic tomography not previously mentioned. Specifically, FIG. 1 illustrates a region 10 which forms part of the McElroy field in the West Texas Permian Basin. A crosswell data survey was performed in 1995 for use in mapping the region. The reservoir depicted in region 10 is a structural/stratigraphic trap about 2850 feet deep and 150 feet thick. The area was a CO2 flood pilot wherein the objective of the survey was to evaluate hybrid water/CO2 injection. Seismic velocity variability in the region is extreme, about 50%, ranging from 14,000 to 23,000 ft/s. A series of four crosswell data profiles was obtained using four relatively vertical wells indicated by the reference numbers 12a–d. Arrows 14a–d indicate the various profiles wherein the arrows are directed from the source well towards the receiving well. It should be noted that constrictions in wells 12b (1202) and 12d (661) prevented logging to maximum depth. As will be seen, such constrictions have significant effects on the two dimensional coverage of prior art velocity tomograms.

Referring to FIGS. 2 and 3, the well geometry of FIG. 1 has been "unwrapped" in a way which facilitates simultaneous viewing and comparison of all four prior art tomograms available from the crosswell survey wherein the unwrapped view is diagrammatically shown in FIG. 2 and a grayscale representation of the actual tomograms is given in FIG. 3. In this regard, one of ordinary skill in the art will appreciate that tomograms are normally depicted in color such that different colors represent velocity variations. Unfortunately, the present forum does not provide for a color presentation. However, the grayscale reproduction of FIG. 3 effectively illustrates the presence of velocity differences corresponding to changes in the geologic structure and material properties in different regions between the wells. The tomograms are shown in order proceeding clockwise around the wells beginning with well 12a. Of course, each tomogram is generated independently in accordance with the method of the prior art. It is noted that the tomogram between wells 12b and 12c is repeated in the figures for purposes of illustrating velocity "ties" or continuity of velocity between adjacent tomograms sharing a common well. Ideally, adjacent tomograms should produce velocities that are identical at the common well.

With attention now directed primarily to FIG. 3, three limitations of prior art two dimensional tomography are apparent. First, there is no velocity information is obtained in an area 16, since the prior art process of generating a tomogram is 2-D in nature and, therefore, makes no estimate of the velocities in area 16. Second, velocity ties at common wells are quite poor. As an example, an area 20, indicated within a dashed rectangle, exhibits particularly inconsistent velocity between adjacent tomograms sharing well 12c. Third, the method becomes increasingly approximate as the out of plane geologic structure deviates from pure horizontal layering.

The present invention provides a sweeping solution to all of the foregoing limitations of conventional crosswell seismic imaging and, at the same time, includes other highly advantageous features which have not been seen heretofore in crosswell seismic methods such as, for example, the ability to include data types beyond that of crosswell datasets.

SUMMARY OF THE INVENTION

As will be described in more detail hereinafter, a method of characterizing the value of a particular property, for example, seismic velocity, of a subsurface region of ground is disclosed herein. This method, like the method of the prior art, uses seismic data which relates to the property of interest. However, in one aspect of the present invention, the value of the particular property is represented, as determined by the seismic data across the region, using at least one continuous analytic function. In one feature, the continuous analytic function is a polynomial such as, for example, a Chebychev polynomial.

In another aspect of the present invention, the seismic data includes data derived from at least one crosswell dataset for the subsurface region of interest and may include other data. In this instance, the present invention may simultaneously utilize data from a first crosswell dataset in conjunction with the other data. In one feature, the other data may include one or more additional crosswell datasets which are simultaneously used with the initial dataset. In another feature, the other data may include borehole geophysical data, other than crosswell seismic data, which is used simultaneously with the data obtained from the first crosswell dataset.

In still another aspect of the present invention, the first crosswell dataset maybe used simultaneously with the other data in a way which defines the value of the property being characterized in three dimensions within the subsurface region of interest.

In yet another aspect of the present invention, crosswell datasets derived using a borehole or boreholes having a high deviation from the vertical direction or derived using even a generally horizontally extending borehole or boreholes are useful in the method of the present invention. With particular regard to traveltime tomography, it should be appreciated that traveltimes identified between any source and receiver position within the subsurface region of interest are generally considered as being inherently useful irrespective of the fact that different traveltimes may have been produced from different crosswell datasets.

The foregoing aspects are at least in part attributable to the method of the present invention including the formulation of a highly advantageous common earth model. The method provides for establishing a specific numerical value of a particular property at any position within a subterranean region of ground encompassing at least two boreholes from which at least one crosswell seismic dataset is generated relating to the particular property and, in formulation of the model, includes the steps of fitting a set of vertically spaced layer boundaries within and across the region encompassing the boreholes in a predetermined way such that a series of layers is defined between the layer boundaries. Initial values of the particular property are established between the layer boundaries and across the subterranean region using a series of continuous analytic functions, at least one of which corresponds to each one of the series of layers. Thereafter, using the crosswell seismic profile(s) or any other appropriate measured data which is available, the continuous analytic functions are adjusted to more closely match the value of the particular property across the subterranean region of ground such that the value of the particular property is determined for any selected point within the subterranean region. In one feature, the continuous analytic functions are adjusted in an iterative manner until such time that a predetermined stopping condition is reached.

The present invention is also highly effective with regard to representing subsurface regions exhibiting complex geological structure such as, for example, dips, high velocity contrasts and discontinuities including faults.

BRIEF DESCRIPTION OF THE DRAWINGS

The present invention may be understood by reference to the following detailed description taken in conjunction with the drawings briefly described below.

FIGS. 14–17 are diagrammatic elevational views illustrating fans of rays extending between two of the boreholes in an exemplary region including a small slow velocity layer, shown here to illustrate the iterative ray-bending approach of the method of the present invention and the rapid convergence achieved in the iteration.

DETAILED DESCRIPTION OF THE INVENTION

Figure 1:
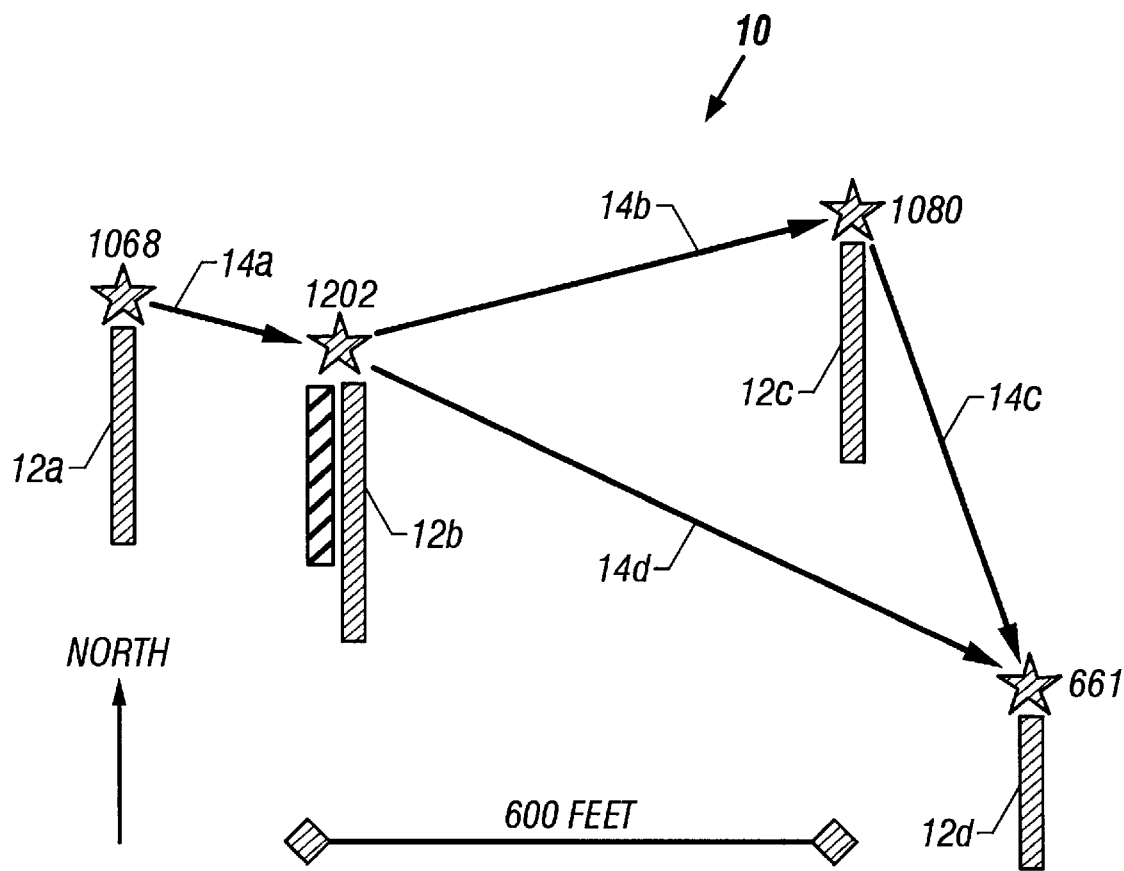
FIG. 1 is a diagrammatic perspective view representing one actual subterranean region penetrated by a plurality of boreholes between certain ones of which crosswell datasets were obtained.
Figure 2:
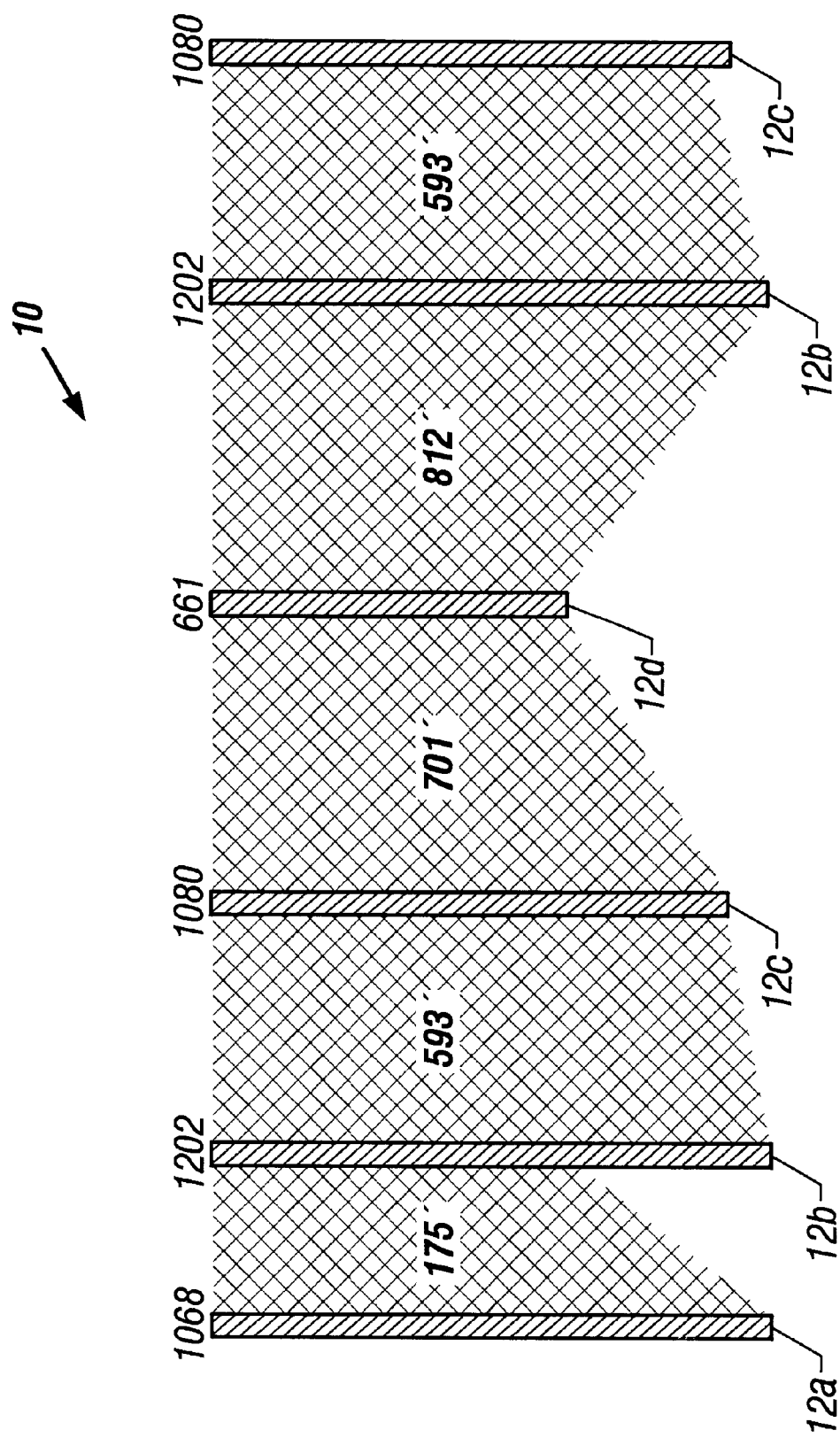
FIG. 2 is a diagrammatic two-dimensional "unwrapped" planar view of the boreholes shown in FIG. 1, shown here to illustrate the relative depths of the boreholes, including constrictions, and to clearly depict the relationship of prior art two-dimensional tomograms taken between the boreholes as laid out in the presentation of FIG. 3.
Figure 3:
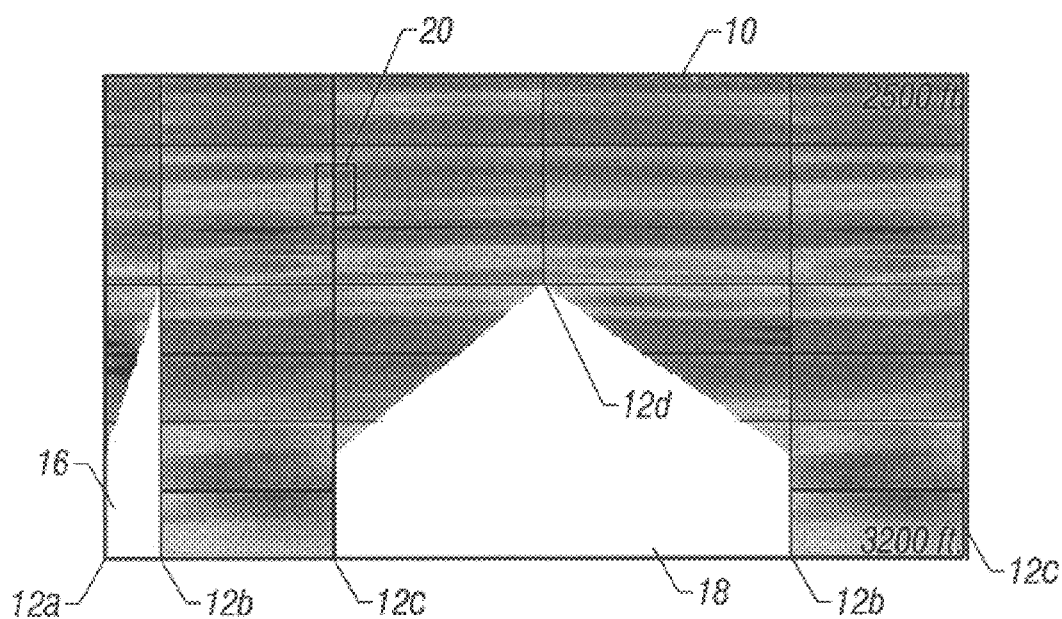
FIG. 3 is a grayscale representation of a series of prior art two-dimensional tomograms illustrating planes of view taken between the boreholes of FIG. 1 in the unwrapped view of FIG. 3, shown here to illustrate poor crossline ties between adjacent tomograms sharing the same borehole and further showing areas of the region where no coverage is provided by the prior art tomograms.
Figure 4:
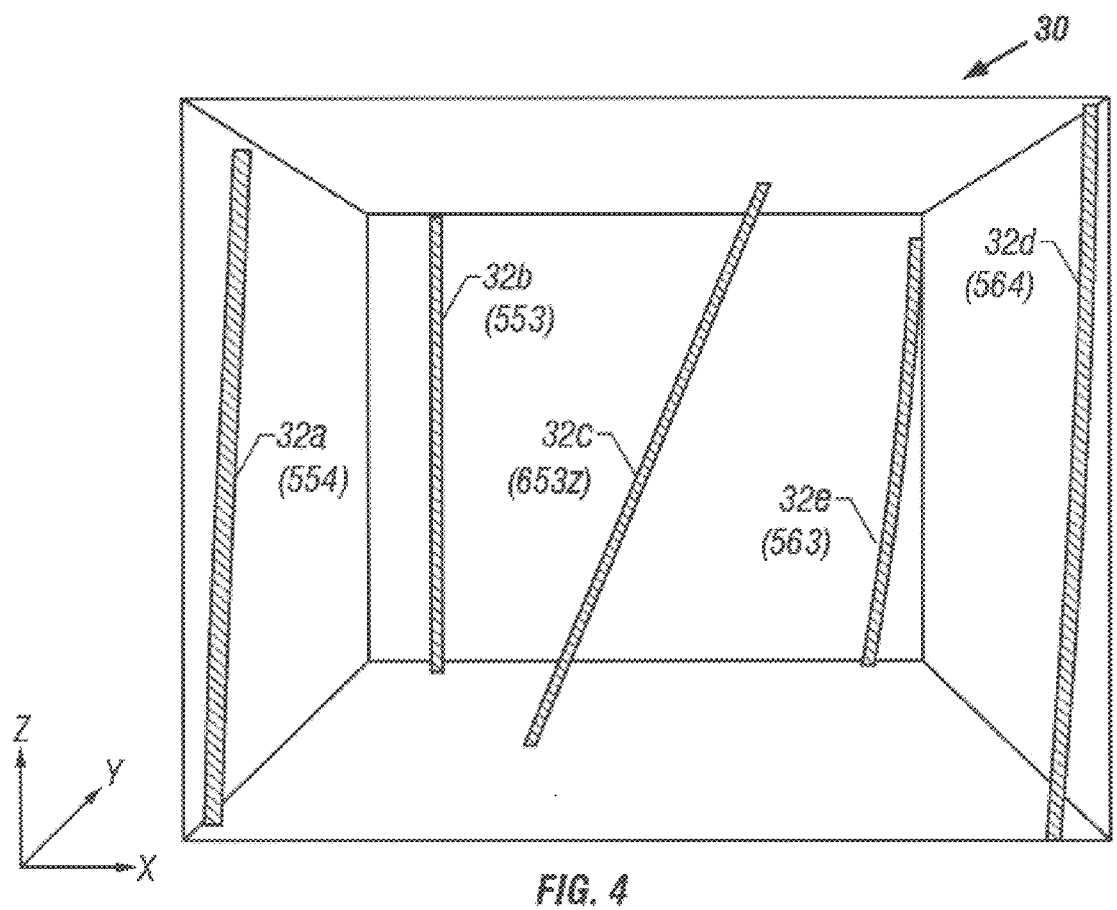
FIG. 4 is a diagrammatic perspective view representing another actual subterranean region penetrated by a plurality of boreholes between certain ones of which crosswell datasets were obtained.

Having previously described FIGS. 1–3, attention is immediately directed to FIG. 4 which is a perspective view of a subterranean region of ground generally indicated by the reference numeral 30. Region 30 includes five boreholes/wells indicated as 32$a$–$e$. It is of interest to note that the borehole geometry of FIG. 4 is representative of an actual geometry found in the Buena Vista Hills oil field of Kern County, Calif. and is often called a 'five-spot'. In 1997, a crosswell survey was taken in this field yielding four crosswell datasets. For all profiles, well 32$c$(653$z$) was the source well, and receivers were placed in wells 32$a$(554), 32$b$(553), 32$d$(564) and 32$e$(563). It should be appreciated that a prior art tomographic image could be produced for each one of these datasets. In fact, prior art tomograms were prepared for each of these profiles but exhibited unrealistic characteristics due to the inability of prior art methods in dealing with significant deviation from the vertical of well 32$c$(653$z$). As will be described in detail at appropriate points below, these prior art tomograms exhibited poor crossline ties, and the apparent geologic structure in the tomograms was not structurally consistent with well log correlations and other geologic information from the area. Consequently, the two-dimensional tomograms of the prior art were deemed to be unusable by the interpreting geoscientist.

Still referring to FIG. 4, in the Buena Vista field of region 30, wells are most commonly drilled near vertical. This is seen to be the case in the instance of wells 32$a$, $b$, $d$ and $e$. However, as mentioned, well 32$c$ is deviated more significantly at approximately 30° from vertical in the interval depicted. It should be appreciated that the amount of deviation exhibited by well 32$c$ is small compared to other regions (not shown). In these other regions, wells with generally horizontal trajectories through the reservoir zone are very commonly drilled including, for example, multiple high-cost wells drilled from off-shore platforms. Based on Applicant's experience, deviation of 30° or more from vertical introduces near insurmountable errors in the deviation correction mechanisms employed by the prior art. As will be seen hereinafter, the present invention inherently overcomes the deviation correction problem in a heretofore unseen and highly advantageous way. In fact, results produced by the method of the present invention may actually be enhanced in instances where highly deviated or horizontal wells are encountered, for reasons which will be described.

Figure 5:
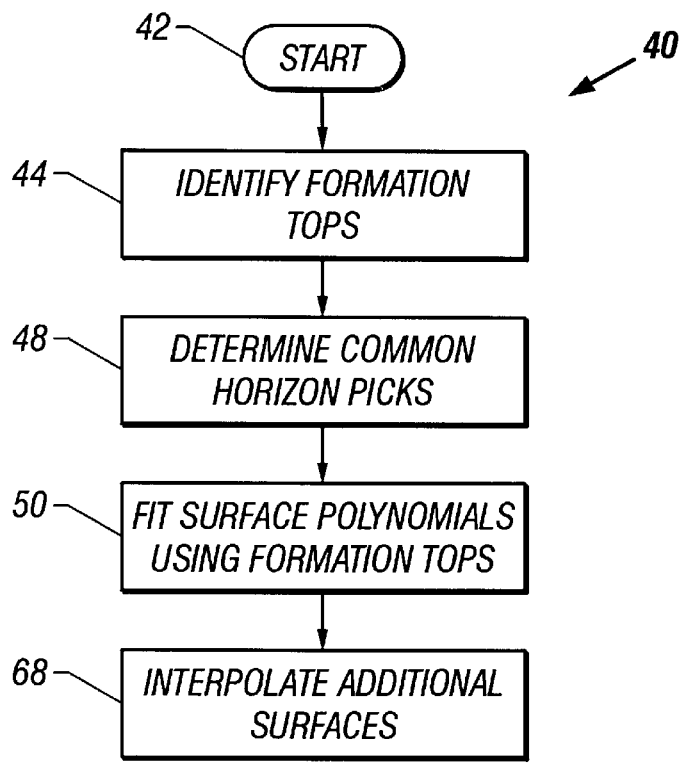
FIG. 5 is a flow diagram illustrating one approach for initially formulating the common earth model of the present invention.
Figure 6:
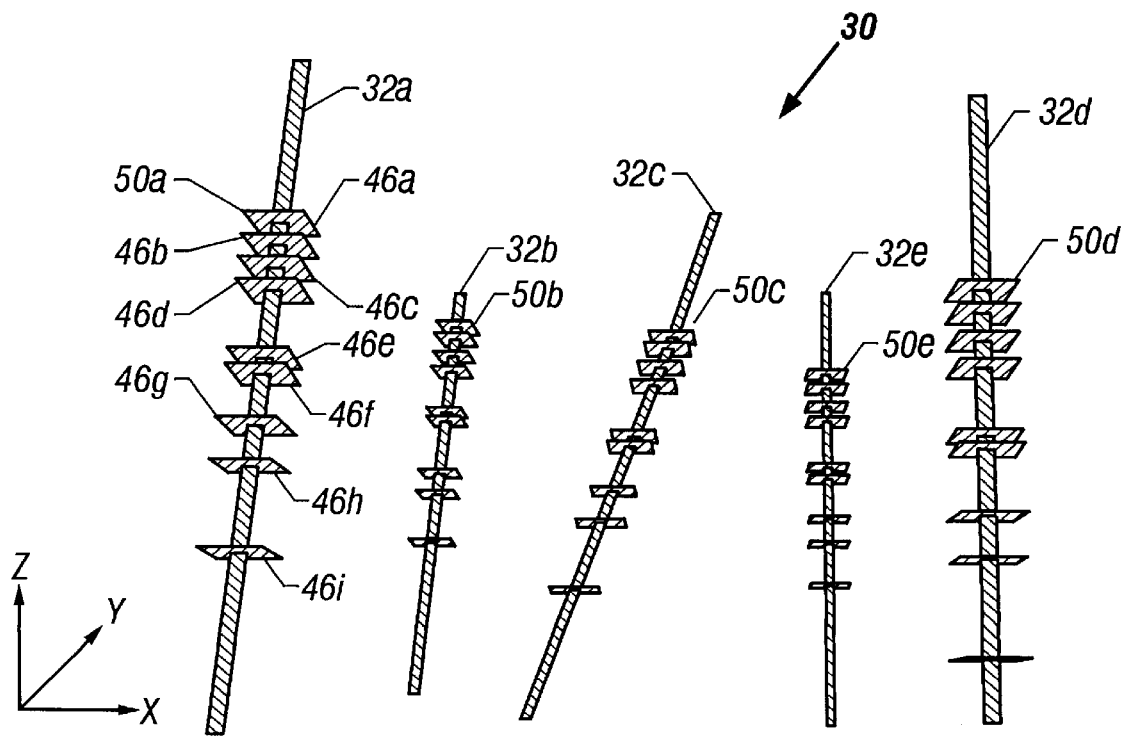
FIG. 6 is a diagrammatic perspective view again illustrating the region initially shown in FIG. 4 including the boreholes therein, shown here to illustrate formation tops identified along the depth of each borehole.

Having described region 30 and referring now to FIGS. 5 and 6, a basic framework will now be provided regarding the application of the method of the present invention in this region using an associated, highly advantageous model which will be referred to hereinafter as a "common earth" model. FIG. 5 illustrates certain steps in the method of the present invention generally indicated by the reference numeral 40 and beginning with Start step 42. Initially, it should first be noted that information in the form of well logs is normally available for each borehole in the region. These well logs may be produced using various techniques including, but not limited to wireline logging, drilling cuttings logging, core sampling, vertical seismic profiling, and measurement while drilling (MWD). The particular technique employed for producing the well logs is of significance only to the extent that the geologic characteristic of interest such as, for example, velocity can be characterized with reasonable accuracy in the ground immediately surrounding the borehole. Using the characteristic as measured by the well logs, changes indicative of strata boundaries known in the art as "formation tops" are identified in step 44 along the depth of each borehole. In the present example, nine formation tops have been identified for each well. In the instance of well 32$a$, the formation tops are indicated by the reference numbers 46$a$–$i$. It is to be understood that the method of the present invention is not limited to the use of well logs in the identification of formation tops. That is, any suitable a priori information may be used in accordance with the present invention. Such a priori information may include, but is not limited to information derived from sensing methods such as surface seismic, borehole seismic, electromagnetic methods, gravity and magnetic methods, geologic and geostatistical modelling. Note that method of FIG. 5 may be used to subsequently identify formation tops in a latter portion of the overall method of the present invention wherein the locations of formation tops may be reassessed in view of the iterative process of model development and inversion described herein. That is, step 44 may be modified to incorporate the use of the model to estimate formation top presence rather than the initial use of well logs. Thus, the entire process, including all of the steps of FIG. 5 to be described, may be repeated more than once to further refine the final model using the previous model as the starting point for determining the formation tops in the next iteration.

Following identification of the formation tops, the method proceeds with step 48 in which common horizons are defined across the region. Specifically, formation tops associated with potential strata boundaries (not shown) extending across the region are identified in a known manner. It should be mentioned that, at this point in the method, the common horizon picks identify only potential strata boundaries. While the selected potential boundaries in many cases ultimately turn out to represent actual strata boundaries, the method of the present invention accounts not only for changing the locations and shape of potential boundaries utilized in the common earth model in a flexible manner, but also provides for adding virtually any number of additional boundaries, as will be further described. Further, the identification of potential strata boundaries is not restricted to points on or near to actual wells, and in some cases information to guide the estimation of potential strata boundaries in arbitrary positions in the subsurface may be available such as from one of the sensing methods mentioned above. One example of a potential boundary is represented by formation tops 50a–e. Overall, nine potential common horizons/boundaries are identified, consistent with the number of formation tops identified for each well.

Figure 7:
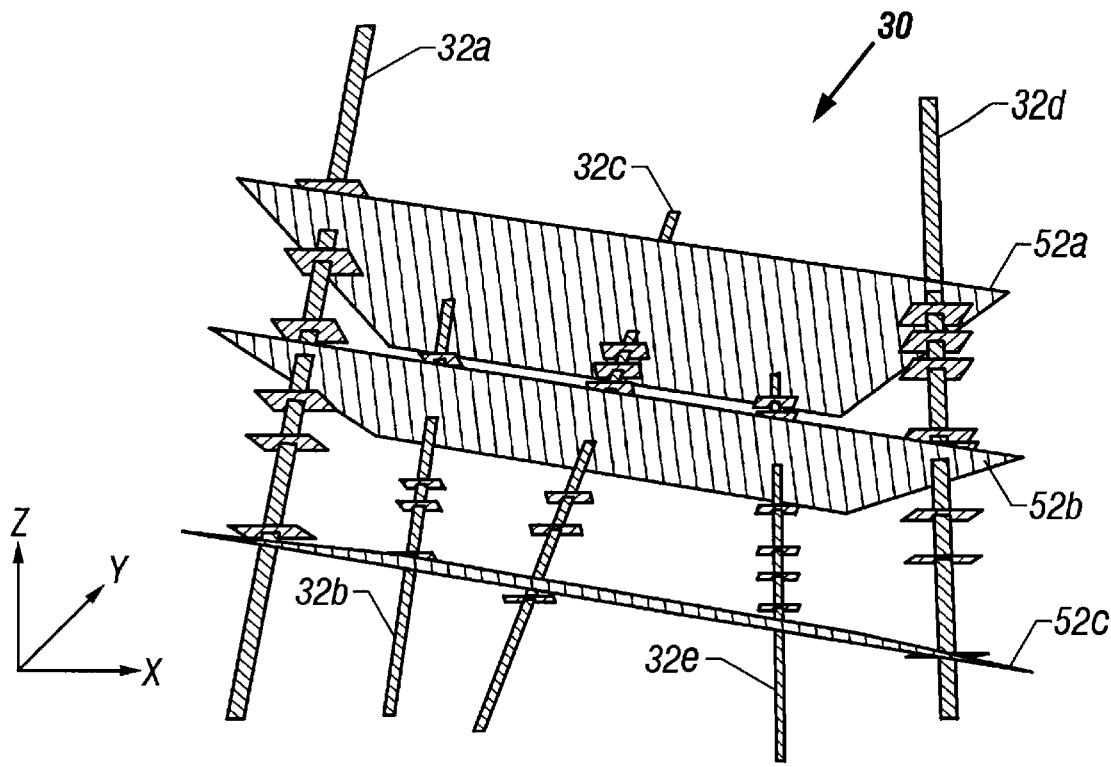
FIG. 7 is a diagrammatic perspective view illustrating the addition of first-order continuous surfaces extending across the subsurface region and fitted using common picks among the formation tops initially illustrated in FIG. 6.

Referring to FIGS. 5 and 7, the method of the present invention continues at step 50 wherein the common horizon picks identifying potential boundaries are used in a highly advantageous way. Specifically, a series of surfaces 52a–c are fitted to the common horizon picks for each potential boundary. Only three surfaces are shown for purposes of clarity, however, it is to be understood that all nine surfaces are actually used, corresponding to the identified potential horizons, and many more could be added as appropriate to the specific area of subterranean ground. It should be appreciated that the mathematical characteristics and formulation of surfaces 52 have been considered carefully in view of the objectives of the present invention. These objectives and the manner in which the common earth model satisfies the objectives will be discussed in detail immediately hereinafter and at appropriate points below.

Continuing with a description of the common earth model of the present invention, one mathematical formulation which has proven to be highly advantageous in defining surfaces 52 utilizes 3rd or higher order Chebychev polynomials. In particular, Chebychev polynomials are used to determine z as a function of x and y for each surface 52 in the form:

$$z=F(x,y)=C_0+C_1x+C_2y+C_3xy+C_4(2x^2-1)+C_5(2y^2-1)+C_6(2x^2-1)y+C_7(2y^2-1)x+C_8(4x^3-3x)+C_9(4y^3-3y) \quad (1)$$

where $C_0$ through $C_9$ are the Chebychev coefficients describing a two dimensional surface with cubic structure. It should be noted that these polynomials are characterized using only ten coefficients. In this way, high spatial resolutions are provided with far fewer model parameters than are seen in typical pixelized prior art models, as will be discussed in further detail at an appropriate point below. The ten coefficients can be grouped into four third-order terms (C6, C7, C8 and C9), three second-order terms (C3, C4 and C5), two first-order terms (C1 and C2) and a constant term (C0). In one feature of the method of the present invention, it is recognized that the weighted distribution of the coefficients in the Chebychev polynomials is highly advantageous as a direct means of controlling the shape or smoothness of the surfaces defined by the functions. By manipulating the weights of the higher order terms (the quadratic and cubic terms involving second and third powers in x and y) the degree of topology in the surfaces may be controlled. In this way, the weighting formulation which is used for the polynomials in a particular geologic setting can be determined based on a priori information such as, for example, the generalized topology established by the predicted horizons/ boundaries in view of the formation tops. In this regard, the mathematical complexity of the overall model can be significantly reduced by utilizing the lowest possible order solution which still describes the geology of the region of interest with sufficient accuracy. As general examples of weighted solutions, a first-order surface is simply a dipping plane that minimizes the "residual" distances between the actual horizon picks and the surface at each well. Surfaces 52, as illustrated in FIG. 7, are first-order surfaces. Examination of FIG. 7 reveals that, for first-order surfaces applied to the topology of region 30, the surface may not intersect all of the horizon picks which define it. This is clearly evident for surface 52c. Therefore, first order surfaces are not considered as appropriate for region 30. Higher order surfaces will be considered immediately hereinafter.

Figure 8:
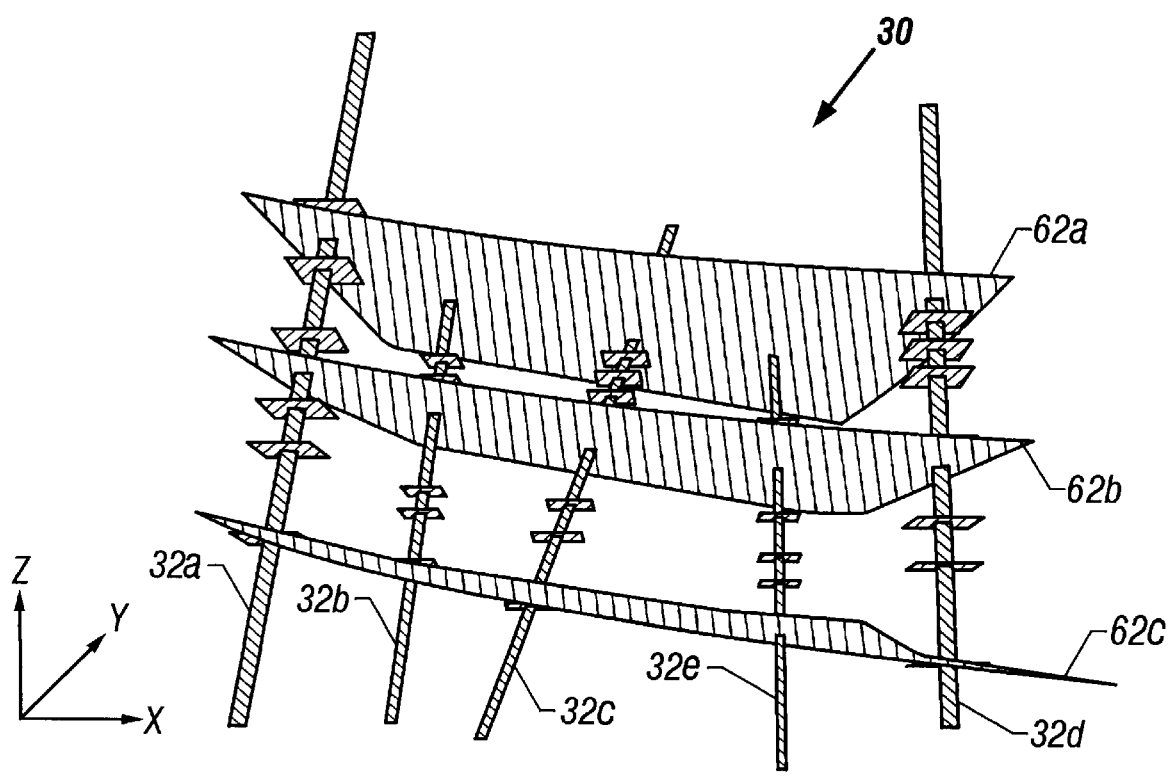
FIG. 8 is a diagrammatic perspective view illustrating the addition of second-order continuous surfaces extending across the subsurface region and fitted using common picks among the formation tops initially illustrated in FIG. 6.
Figure 9:
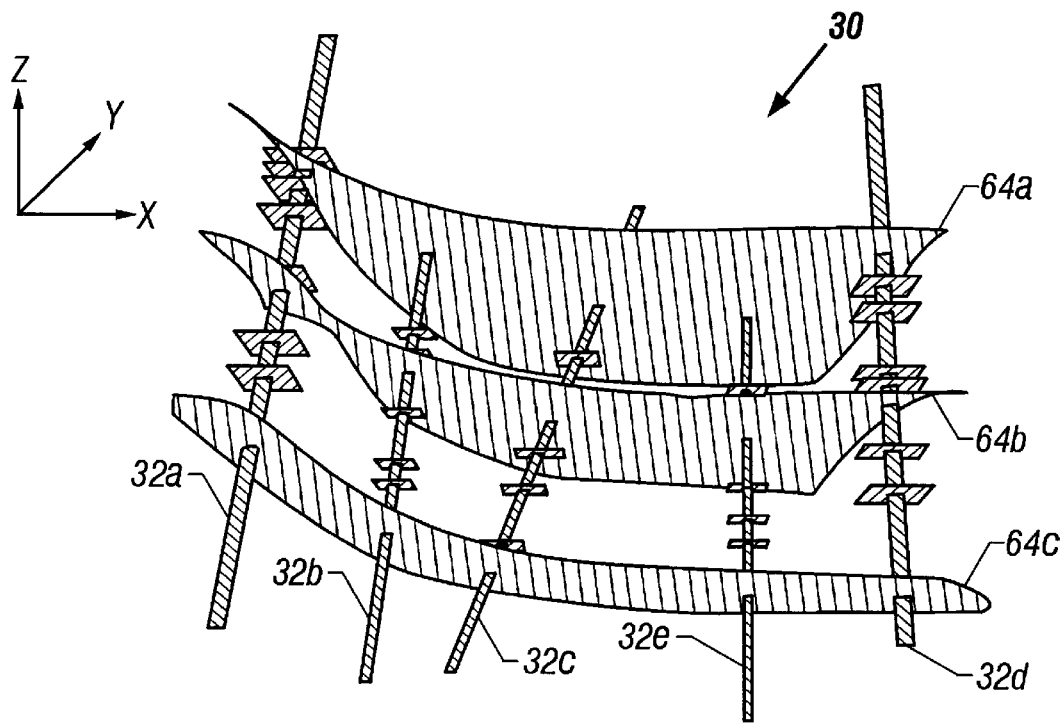
FIG. 9 is a diagrammatic perspective view illustrating an initial series of third-order continuous surfaces extending across the subsurface region and fitted using common picks among the formation tops initially illustrated in FIG. 6.

Attention is now directed to FIGS. 8 and 9 which illustrate second and third-order surfaces, respectively, applied to the horizon picks of region 30. Initially, it is noted that either second-order or third-order surfaces fit to the horizon picks in region 30 will exactly intersect each well at the depth of the horizon pick. Characteristically, there is enough "freedom" with the addition of the quadratic terms in a second-order expression to provide good fit for even closely grouped wells with steep structural contours. In this regard, FIG. 8 shows three of nine second-order surfaces 62a–c fit to the horizon data of FIG. 6 while FIG. 9 shows three of nine third order surfaces indicated as 64a–c. It can be seen in both FIGS. 8 and 9 that the second and third-order surfaces intersect the horizon picks of each well. In view of a priori information including well logs or any other suitable data, it may be determined that the second-order surfaces are most suitable. However, third or higher order surfaces are even more general and can be employed in areas with still greater structural complexity. In either instance, FIGS. 8 and 9 illustrate the three-dimensional consistency of the surfaces for any combination of profiles between the wells.

Figure 10:
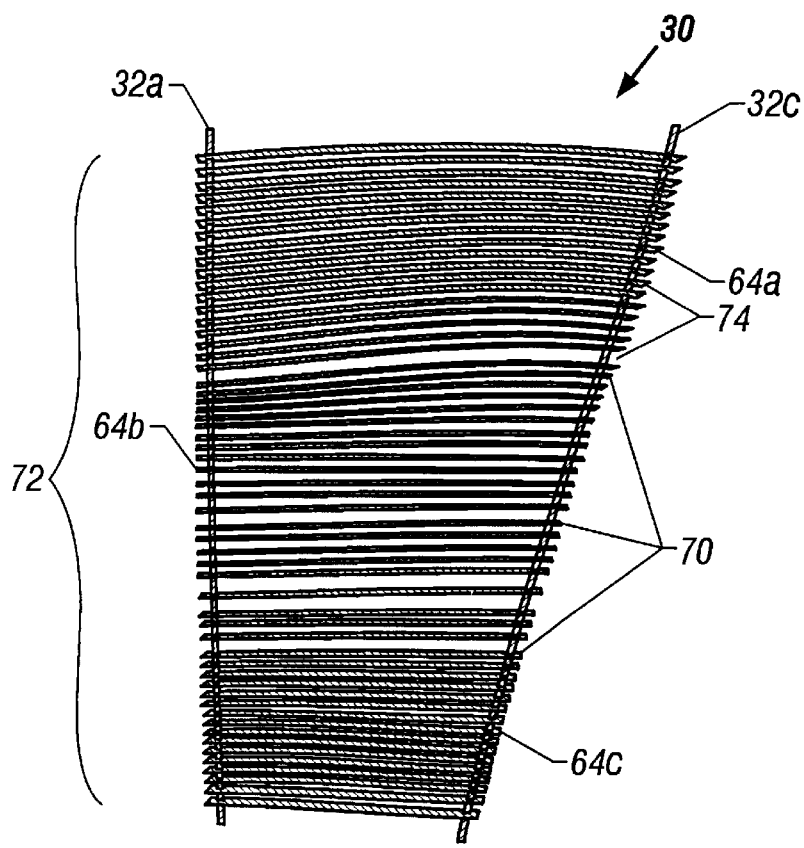
FIG. 10 is an elevational diagrammatic view showing two of the boreholes illustrated in FIG. 9 including the initial series of third-order surfaces and further illustrates additional, interpolated third-order surfaces fitted between the initial series of third-order surfaces.

Referring now to FIGS. 5 and 10, it should be appreciated that the sparse number of surfaces defined by the formation tops represent a starting point for the construction of the remainder of the common earth model to be used herein. In step 68, additional surfaces 70 are interpolated between the nine potential surfaces which were identified using the formation tops. FIG. 10 illustrates wells 32a and 32c in region 30 and considers the use of third order surfaces 64a–c from FIG. 9. As in previous examples, only three, 64a–c, of the nine potential surfaces identified by formation tops are specifically indicated for purposes of clarity. Thus, the common earth model ultimately includes an overall set 72 of close vertically spaced layers with each layer surface described by a Chebychev polynomial. Spacing between the layers is typically on the order of one to two meters in most typical oil or gas reservoirs. However, the spacing may be varied depending upon the available seismic information and other factors such as, for example, sedimentary heterogeneity, sampling constraints, or frequency content of the seismic data. In the present example, the selected spacing was 25 feet for purposes of display clarity. In this regard, it should be appreciated that vertical resolution in the model representation described herein is directly tied to the vertical spacing between the surfaces. It should also be appreciated that even though FIG. 10 displays only the area between two wells, all of the surfaces are valid, and do not intersect anywhere in the entire 3-D model. Any suitable technique may be employed to determine the values of the coefficients for the nine formation top derived polynomials. In the present example, Lanczos Decomposition (SVD) was used to invert the horizon data to establish the coefficients of these polynomials. Thereafter, the coefficients of the interpolated polynomials may be established by any other suitable method of parameter estimation.

It should be appreciated that, in the common earth model of the present invention, using a polynomial characterization of geologic layering is highly advantageous in that the actual geologic structure of a region of interest can in many cases be closely mimicked prior to the inversion process. However, the remarkable flexibility of this model will be brought further to light in the remaining discussions.

With continuing reference to FIGS. 5 and 10, the foregoing descriptions of the common earth model of the present invention have focused on the general topology of the region being modeled. Attention will now be directed to the way in which a geologic characteristic or property of interest is described by the model in a highly advantageous and heretofore unseen way. The characteristic or property of interest may include but is not limited to velocity, attenuation and impedance. In addition, any mathematical formulation using at least one of these or other properties are considered to be within the scope of the present invention so long as teachings disclosed herein are utilized in the formulation. Moreover, combinations of these properties as well as attributes of wave propagation such as, for example, phase, amplitude, and spatial/temporal derivatives thereof and combinations of these attributes are also considered to be within the scope of the present invention. Because the polynomial layer boundaries which make up overall layered arrangement 72 are continuous across region 30, it should be appreciated that a series of continuous layers is defined between these boundaries and across region 30. In FIG. 10, several of these layers are indicated by the reference number 74. For purposes of the common earth model, the properties within each layer are assumed to be homogeneous in the z direction. The characteristic or property of interest is then represented across region 30 for each layer using at least one continuous analytic function. For this purpose, a second series of Chebychev polynomials is used for each interpolated layer defined within the initial series of continuous boundaries to characterize the value of the property in the x-y across the extents of region 30, as will be further described. It is submitted that this characterization of a seismic or seismic derived property, in and by itself, is highly advantageous and has not been seen heretofore as applied to borehole seismic imaging.

Still discussing the polynomial characterization of geologic properties of the present invention, one property which has traditionally proven to be useful is seismic velocity. In the present example, the inverse of velocity i.e., slowness has been chosen for representation using Chebychev polynomials since integration of slowness along a raypath gives the traveltime of that path, as will be further described. Representation of the slowness fields as Chebychev polynomials is a key aspect of this formulation for reasons which will become apparent below. For the moment, however, it should be noted that this formulation enables analytical calculation of all of the partial derivatives required for both forward modeling and the tomographic inversion in closed form. Partial derivatives of the velocity field and raypaths with respect to each of the coefficients are a necessary component of most tomographic inversion approaches.

Figure 11:
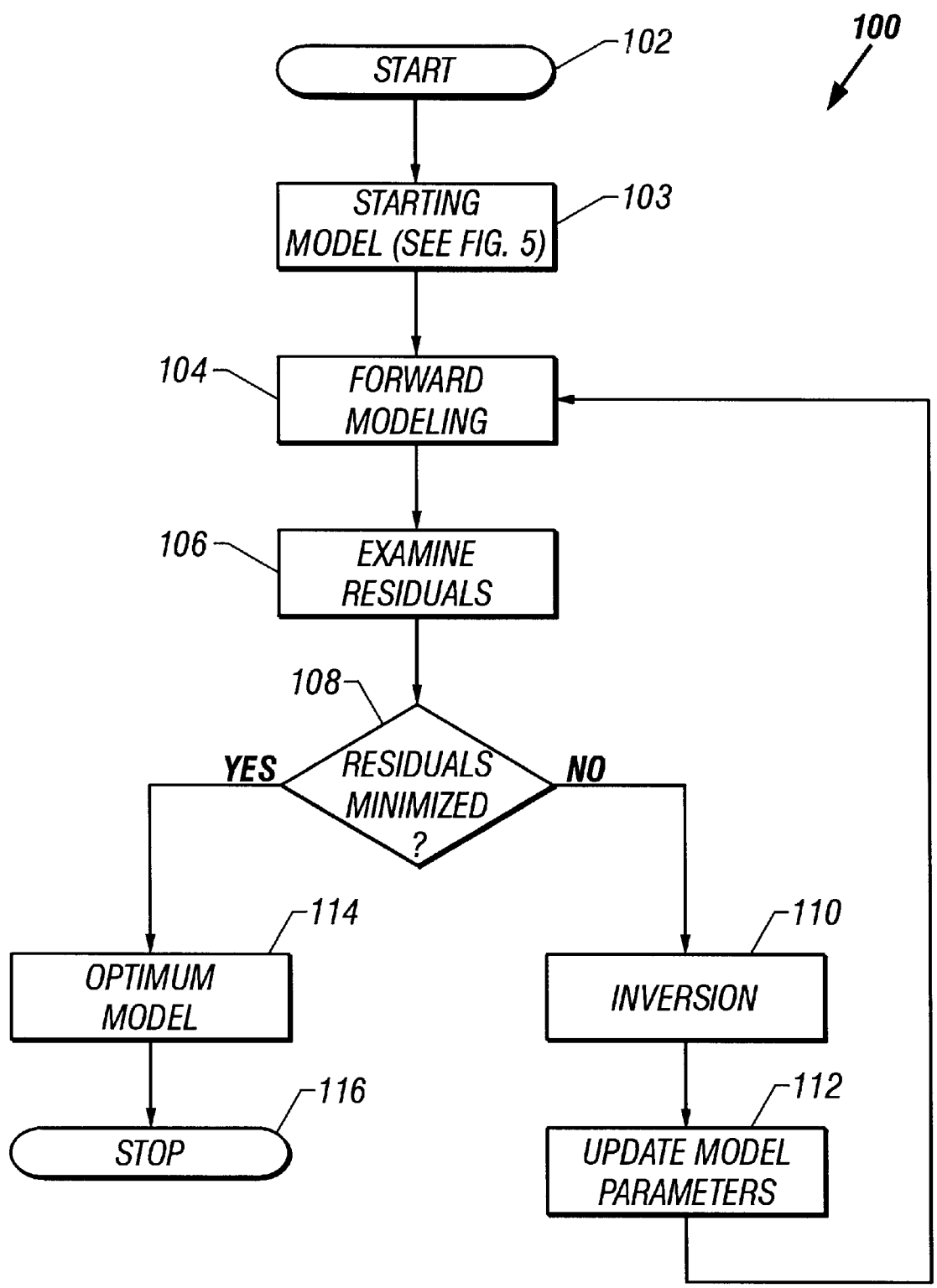
FIG. 11 is a flow diagram illustrating steps included in the overall method of the present invention.

Turning to FIG. 11 and having generally described the common earth model of the present invention, a general discussion of the inversion process is now provided which will serve as an initial framework for considering the application of the common earth model within the method of the present invention and which will further serve in subsequent discussions pointing out the advantages of the present invention. It should also be mentioned that the use of the common earth model will initially be considered using direct arrival traveltime data, as is typically done in conventional two-dimensional tomography, and other data types will be considered at appropriate points below. The inversion process shown in FIG. 11 is generally indicated by the reference number 100 and begins with a start step 102 and the associated starting model which is established in a highly advantageous way in step 103 encompassing the steps shown in FIG. 5 and discussed earlier. Thereafter, in forward modeling step 104, a forward modeling step is generally performed in view of actual traveltimes measured between source and receiver positions. Forward modeling of direct arrival traveltimes can be accomplished in a highly advantageous manner to be described. At step 106, the difference between traveltimes calculated during forward modeling step 104 and the actual traveltimes is established in a way which determines a residual function. That is, the residual function sets forth the difference between the forward modeled traveltimes and the actual traveltimes.

Following step 106, an iterative process is initiated in step 108 wherein step 110 is next executed in the event that certain specified termination criteria have not been met. In step 110, a velocity inversion is performed. The inversion optimizes updates to the model parameters with the objective of reducing the residuals. The information used in the inversion is fundamentally some sensitivity function of model parameters based on ray trajectories. Usually, the inversion process finds a vector of model updates. In general, partial derivatives of traveltime with respect to changes in the model parameters calculated during forward modeling step 104 (in this case, the coefficients of the Chebyshev polynomials that describe slowness within each layer are used). There may some optimum scaling that can be applied to this vector to maximize the rate of convergence. The inversion used in the present invention utilizes a linear search to locate the optimum scale factor for the vector of model updates. In step 112, the model parameters are updated.

After the update, the method returns to step 104 repeating the forward modeling step. The overall iterative process in FIG. 11 of inversion, updating of the model parameters, and calculation of traveltimes for the new model, with the objective to minimize the objective function or residuals, in this case traveltime residuals, is continued until at some point a criterion for stopping the iteration is reached. In this instance, if the termination condition is satisfied in step 108, step 114 indicates that the model has been optimized and the method concludes with a stop step 116. Generally, it is not possible to reduce the residuals to zero for various reasons including, but not limited to errors in the actual traveltime data. Therefore, the objective is to seek a "global minimum" for the traveltime residuals representative of a geologically plausible state of model parameters in which modeled traveltimes are as close as possible to the actual data. As the model parameters are updated, traveltime residuals should generally decrease with the iterative process.

With the general steps of the tomographic inversion process of the present invention set forth immediately above, discussions will now be provided with regard to the use of the common earth model of the present invention within the context of these steps in particular consideration of the fact that 3-D crosswell imaging has not heretofore been seen. One focus of interest will be that of the specific advantages of the common earth model and how these advantages can be exploited in the instance of 3D traveltime inversion.

Initially considering parameterization of the common earth model, it should be appreciated that two requirements have been met by the present invention for a 3-D model configured for simultaneous inversion of multiple profiles at high spatial resolution. Specifically, the common earth model provides sufficient detail for high-resolution and is considered to be as well-determined as possible for the overall inversion process. The term "determined" refers here to the condition of the inversion in view of the ratio of data to unknowns. An under-determined problem contains more unknowns than can be resolved by the data. Under-determined inversion results are non-unique and sensitive to small changes in the weighting or constraints used in the inversion. Over-determined inversions contain more data than unknowns, and results are therefore unique, subject to the constraints imposed by the parameterization of the model. However, not all of the available detail is extracted from the data dependent upon the degree of over-determinism. In contrast, a well-determined model extracts the maximum resolution from the data. Historically, the two requirements above have been mutually exclusive in that traditional crosswell models use pixels for 2-D. Increasing spatial resolution in pixelized models requires increasing the number of model parameters (pixels), and makes the inverse problem less well-determined. Thus, the common earth model is considered to be highly advantageous in terms of having achieved an optimum balance between parameters and data.

One of ordinary skill in the art will appreciate that the development of a highly effective three dimensional model in the form of the common earth model presents the need for development of a three dimensional forward modeling technique in step 104 of FIG. 11. To that end, a highly advantageous three dimensional ray-bending technique will be disclosed which is particularly well suited for use with the common earth model for velocity imaging. Moreover, several key advantages of the common earth model parameterization become clear as this ray-bending methodology is presented. The subject ray-bending technique is, in essence, based on the calculation of partial derivatives of traveltime with respect to a raypath. One advantage of the technique resides in rapid convergence even in the instance of extremely heterogeneous models. For example, the ray-bending technique is capable of determining accurate raypaths for a fastest arriving arrival, which for the purposes of this illustration and the remaining discussion is termed the direct arrival, and thus is capable of determining the traveltime of the same with good accuracy, even in the presence of velocity contrasts that readily cause prior art ray tracing methods to fail.

Attention is now directed to the manner in which the ray-bending technique operates. Specifically, the technique minimizes the traveltime for a given ray. If the final trajectory satisfies the added constraint of least time (based on Fermat's principle), it can be considered an accurate model of the direct ray path. In the common earth model, traveltime is calculated using line integrals through the velocity fields/layers as given by the second series of Chebychev polynomials described in the foregoing discussions. One assumption of note in the ray-bending technique is that the boundary spacing (i.e., layer thickness) in the common earth model is sufficiently small such that a raypath is piecewise linear across each layer. As described above, the polynomial formulation actually represents slowness, since integration of slowness yields traveltime. Thus, for a ray segment between two of the model surfaces, the slowness field $S(x,y)$ is represented for each layer with a third-order Chebychev polynomial in the form:

$$S(x,y) = C_0 + C_1 x + C_2 y + C_3 xy + C_4 (2x^2 - 1) + C_5 (2y^2 - 1) + C_6 (2x^2 - 1) y + C_7 (2y^2 - 1) x + C_8 (4x^3 - 3x) + C_9 (4y^3 - 3y) \quad (2)$$

where $C_0$–$C_9$ are the ten Chebychev coefficients.

The traveltime (T) for the straight ray segment between points A and B on adjacent surfaces can be written:

$$T = \int_A^B S(x, y) dr \quad (3)$$

where dr is an incremental step along the path between A and B. For the straight segments between surfaces, this integral is readily calculated by performing parametric integration. Note that partial spatial derivatives of traveltime with respect to the locations A and B can be advantageously analytically calculated in closed form. Performing the integration yields:

$$T(x_1, y_1, z_1, x_2, y_2, z_2, C_0, C_1, C_2, C_3, C_4, C_5, C_6, C_7, C_8, C_9) =$$

$$\text{sqrt}[(x_2-x_1)^2 + (y_2-y_1)^2 + (z_2-z_1)^2]\{C_0 + C_1[\tfrac{1}{2}(x_1+x_2)] +$$

$$C_2[\tfrac{1}{2}(y_1+y_2)] + C_3[\tfrac{1}{3}(x_1 y_1 + x_2 y_2) + \tfrac{1}{6}(x_1 y_2 + x_2 y_1)] +$$

$$C_4[\tfrac{2}{3}(x_1^2 + x_1 x_2 + x_2^2) - 1] + C_5[\tfrac{2}{3}(y_1^2 + y_1 y_2 + y_2^2) - 1] +$$

$$C_6[\tfrac{1}{2}(x_1^2 y_1 + x_2^2 y_2 - y_1 - y_2) + \tfrac{1}{6}(x_1^2 y_2 + x_2^2 y_1) + \tfrac{1}{3}(x_1 x_2 y_1 + x_1 x_2 y_2)] +$$

$$C_7[\tfrac{1}{2}(y_1^2 x_1 + y_2^2 x_2 - x_1 - x_2) + \tfrac{1}{6}(y_1^2 x_2 + y_2^2 x_1) + \tfrac{1}{3}(y_1 y_2 x_1 30\ y_1 y_2 x_2)]$$

$$+ C_8[x_1^3 + x_2^3 + x_1^2 x_2 + x_1 x_2^2 - \tfrac{3}{2}(x_1 + x_2)] +$$

$$C_9[y_1^3 + y_2^3 + y_1^2 y_2 + y_1 y_2^2 - \tfrac{3}{2}(y_1 + y_2)]\} \quad (4)$$

where T is traveltime and $C_0$–$C_9$ are the ten Chebychev coefficients. It should be appreciated that equations 2 and 4 are relatively simple in form. In contrast, expressions for traveltime and slowness seen in prior art models such as, for example, pixelated models can be extremely complex, requiring relatively enormous computational power merely for the production of two-dimensional tomograms. Remarkably, the simplicity of the expressions used in the common earth model of the present invention is attributed to the polynomial formulation of the common earth model. In this regard, it should be appreciated that in the initial stages of the parametric expansion the traveltime expression contained over one hundred terms. However, during derivation of the foregoing expressions, an enormous number of terms cancel, leaving only the terms seen. This highly advantageous result was unanticipated. Moreover, other aspects of the velocity inversion to be described and the forward modeling inversion under discussion are highly advantageous. For example, the matrix to be inverted in either instance has been found to be band-diagonal and symmetric.

Figure 12:
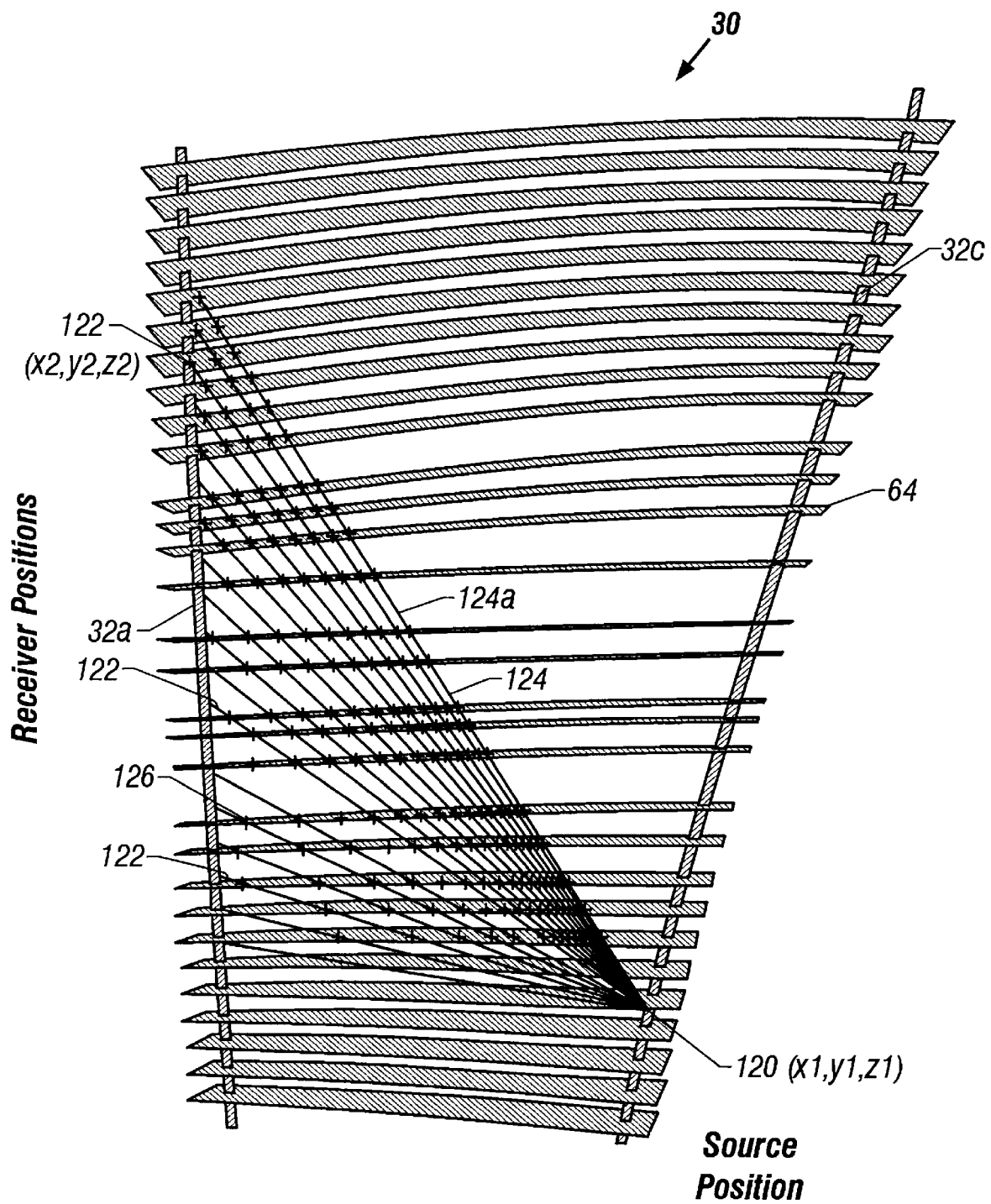
FIG. 12 is an elevational diagrammatic view showing the boreholes illustrated in FIG. 10 including the initial and interpolated surfaces and further illustrating intersection points of a fan of rays with the surfaces wherein the rays extend from a source position in one borehole to a plurality of receiver positions distributed along the depth of the other borehole.

Turning to FIG. 12, the ray-bending technique of the present invention, as used with the common earth model, begins by finding the intersection points of straight rays with the initial series of Chebychev boundary surfaces for source and receiver locations between which a traveltime is available. FIG. 12 illustrates a portion of region 30 including wells 32a and 32c. A source position 120 is located along well 32c while a plurality 122 (only three of which are indicated) of receiver positions are located along well 32a. Third order Chebychev polynomial surfaces 64 are also shown extending across region 30 in conjunction with a fan of straight rays 124 between source position 120 and each of receiver positions 122 such that the rays form a plurality of intersections 126 with surfaces 64 denoted by a plurality of "cross-hairs" at the intersection locations. For third-order Chebychev polynomial surfaces, intersections 126 are found by solving the roots of a cubic equation. For one particular ray, if the source position is represented by the coordinates $(x_1,y_1,z_1)$ and the receiver position is represented by the coordinates $(x_2,y_2,z_2)$, then a straight line connecting source and receiver can be described by the two equations: $x=D_1z+D_2$, and $y=D_3z+D_4$. The four coefficients, $D_1$, $D_2$, $D_3$, and $D_4$ can be found by substituting the coordinate values for x and y at the source and receiver positions.

Substituting these expressions for x and y into equation 4 for a selected one of the boundary surfaces 64 yields a cubic equation in z with a real root lying at the intersection of that particular straight ray 124 and the selected surface 64. By solving one cubic for each surface in the model, all of the intersection points are obtained as required for ray tracing/bending with regard to known traveltimes. With all of the intersections to hand, the partial derivatives of traveltime with respect to moving the intersection point may be determined. Because the intersection points are constrained to remain on the model surfaces, the derivatives are calculated only in two dimensions (x and y). Once again, it is noted that, because an analytic expression for traveltime is used, these spatial partial derivatives are advantageously determined in closed form.

Figure 13:
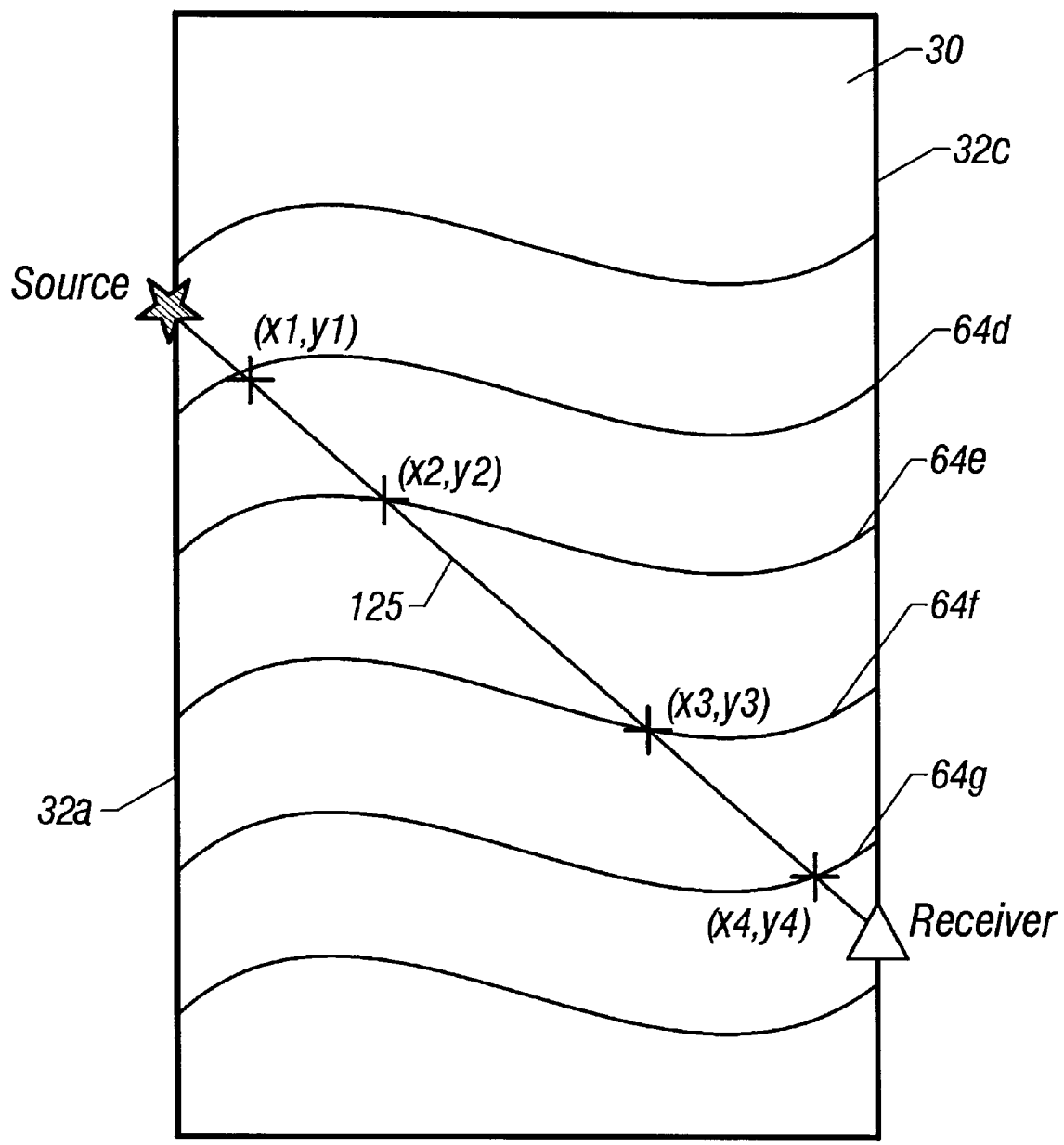
FIG. 13 is an elevational diagrammatic view showing a portion of the boreholes illustrated in FIG. 12 including one exemplary raypath extending between the boreholes and intersecting certain ones of the third-order surfaces, shown here to illustrate the coordinates of the raypath at these intersection points.

Referring to FIG. 13, in order to minimize traveltime, a simultaneous inversion of all of the intersection locations is employed. It is noted that Newton's algorithm performs well in this regard for the common earth model. FIG. 13 diagrammatically illustrates raypath 124a in region 30 between wells 32a and 32c. Raypath 124a intersects boundary surfaces 64d–g. The intersections of raypath 124a with surfaces 64d–g are indicated as (x1,y1), (x2,y2), (x3,y3) and (x4,y4), respectively. Newton's method does require the matrix of second partial derivatives of traveltime with respect to x and y of the intersection points, however a more accurate update step could be performed using second derivatives as well as first derivatives. Referring to equation 4 it can be seen that derivatives of x or y can be taken in closed form. These second derivatives can be calculated in closed form at little cost in time or resources. To illustrate the technique, the vector of intersection points that contains pair-wise the x and y locations of all the intersection points for a given ray is formulated as:

$$X_i 32\ (x1,y1,x2,y2,x3,y3,\ldots,xn,yn). \quad (5)$$

The vector of first partial derivatives of traveltime with respect to these positions is then $$\frac{\partial T}{\partial X_i},$$

and the matrix of second partial derivatives is:

$$\frac{\partial^2 T}{\partial X_i \partial X_j}$$

where T is traveltime. With this notation, the application of Newton's algorithm can be written:

$$\frac{\partial^2 T}{\partial X_i \partial X_j}\lambda_i = -\frac{\partial T}{\partial X_i} \quad (6)$$

Where T is traveltime given in equation 4, $X_i$ and $X_j$ are vectors containing the locations of the surface intersection, and $\lambda_i$ is a vector of perturbations to the intersection locations designed to minimize traveltime, so as to define a system of equations. By solving this system of equations, a vector of updates to the model parameters, $\lambda_i$ is found. One method for finding $\lambda_i$ is to perform a linear section search for a scale factor to apply to the model update vector. As mentioned, one highly advantageous feature which arises in using this technique resides in the fact that the matrix of second (Frechet) derivatives has been found to be band-diagonal and symmetric, significantly limiting the number of second derivatives for which values must be determined. A number of other advantages are attendant to this feature including the ability to readily factorize the matrix at far less cost than, for example, using SVD, as will be appreciated by one familiar with SVD.

Figure 16:
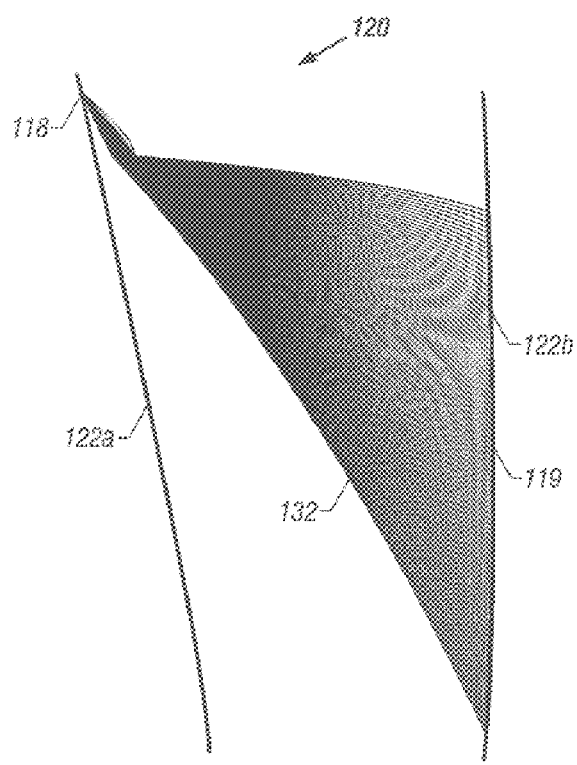
Figure 17:
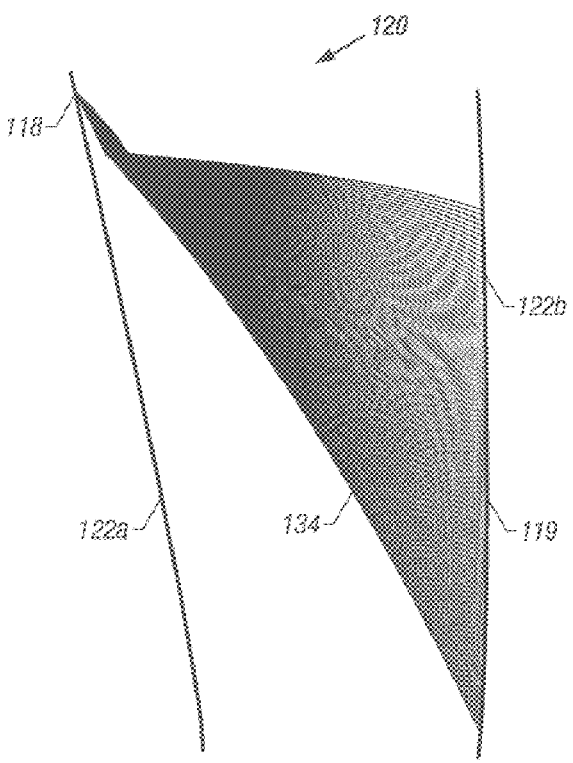

Referring collectively to FIGS. 14–17, the ray-bending technique introduced immediately above is highly advantageous with regard to its convergence properties. Specifically, in models with velocity contrasts of 25% most rays require fewer than 10 iterations, as will be demonstrated. To illustrate this rapid convergence FIGS. 14–17 show raypaths between a source position 118 and a plurality of receiver positions 119 in a model region 120 between two boreholes 122a and 122b. The model includes fine layering and a 20% vertical velocity gradient. The velocity field and model layering have not been shown for purposes of clarity. However, it is noted that the uppermost portion of the model contains a small slow velocity layer within a circular area indicated by reference number 124 (FIG. 14). FIG. 14 further illustrates a fan 128 of straight rays between the boreholes. The results of ray-bending in accordance with the present invention are illustrated after one iteration (FIG. 15) resulting in a fan 130 of rays, two iterations (FIG. 16) resulting in a fan 132 of rays and one hundred iterations (FIG. 17) resulting in a fan 134 of rays. It is evident that the raypaths are optimized by the first few iterations, as seen in FIG. 16. In fact, it has been observed that very little change occurs after only five iterations (not shown). Comparison of FIGS. 16 and 17 reveals that there is little change in the rays from two iterations to one-hundred iterations. Thus, the ray-bending technique of the present invention is highly advantageous with regard to efficiency. Still another advantage of the ray-bending technique will be presented immediately hereinafter.

Figure 18:
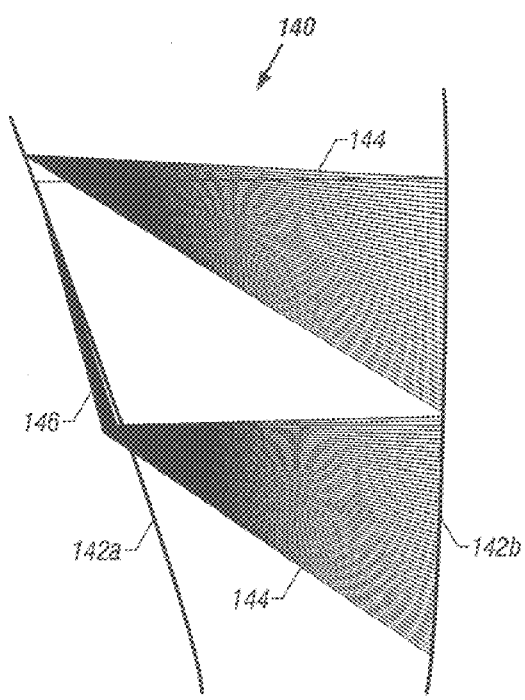
FIG. 18 is a diagrammatic elevational view illustrating a fan of rays extending between two boreholes in an actual region including strong velocity contrasts, shown here to illustrate the way in which the fan of rays is forced outside of the interwell plane defined between the boreholes as a result of the velocity contrasts, as a example of only one instance in which the present invention is highly advantageous.

Attention is now directed to FIG. 18 serving to illustrate another advantage of the three dimensional ray-bending technique of the present invention which results from the use of the common earth model. This figure represents an actual region 140 between two deviated wells 142a and 142b. Region 140 includes strong velocity contrasts. A fan 144 of rays is shown between the wells after having undergone a sufficient number of iterations. It is observed that the combination of deviated wells and strong velocity contrasts has been found to be capable of forcing a group 146 of rays 144 outside of what, in two-dimensional tomography, is conventionally the model space. That is, at least portions of rays 146 are not contained by the interwell plane. It should be recognized in this regard that any model parameterization restricted to an interwell plane would fail in the circumstances shown in FIG. 18. Moreover, the common earth model handles this region with no special consideration, and, indeed, raypaths 146 shown in FIG. 18 do satisfy Fermat's minimum traveltime requirement. In contrast, the prior art typically employs a "shooting" method, rather than ray-bending. One problem with the shooting approach is assignable to the fact that often the traveltimes for raypaths in areas, for example, of complex structure, as demonstrated by raypaths 146, cannot be obtained. Hence, resolution deteriorates. Generally, prior art ray tracing methods have increasing difficulty as models become more complex, and crucial raypaths, through the regions with the highest velocity contrasts, cannot be obtained. Ironically, these regions of high velocity contrast are typically of great interest to the field engineer or geoscientist. The ray-bending technique employed in conjunction with the common earth model has not only proven to be effective in regions of complex structure, but also has proven to be very robust and stable, even for models with very high velocity contrasts. By using the ray-bending approach, accurate raypaths are assured through any geologically reasonable model including, of course, the common earth model. In the case of the common earth model, the ray-bending approach also offers significant computational efficiency advantages over a ray-shooting method.

Referring again to FIG. 11, the model iteration and inversion process of the method of the present invention will now be considered using the common earth model. One general goal in the development of the overall non-linear model iteration process of the present invention resides in automating the process, particularly the inversion process, to the greatest extent possible. Typically, the starting common earth model would be formulated, for example, by fitting surfaces based on well-log data, picking a dataset from available data for the region of interest such as, for example, direct arrival traveltimes from one or more crosswell data profiles and, thereafter, initiating the model iteration and inversion process until such time that the optimum final result is achieved. Traditionally, this goal has been unmet. Often, prior art inversion algorithms require constant user attention to prevent models from diverging or providing geologically unrealistic solutions. Techniques using shooting ray tracing methods in particular suffer from this problem. For reasons which will be further discussed, conventional methods using pixelized models rarely produce a truly global minimum in traveltime residuals unless particular attention has been paid to inversion constraints during the course of iteration. In contrast, the present invention has markedly, if not fully, achieved this goal through the use of a highly advantageous inversion technique within the overall non-linear model iteration and inversion process to be described immediately hereinafter.

One significant problem which was encountered in the inversion process used herein regards establishing values of the polynomials used in the common earth model describing the property of interest. Specifically, the value of the property was seen to be well behaved in the areas of the boreholes, however, at some locations away from the boreholes, sometimes unrealistic values (for example, infinity) were seen. Such a result is considered to be unacceptable in accordance with the present invention and geologic plausibility. In order to resolve this problem and to provide for an essentially "automated" inversion process, constraints have been employed in a highly advantageous way which has not been seen in the crosswell seismic imaging arts. Specifically, a continuation constraint approach is utilized. The continuation constraint approach is configured for first resolving long-wavelength features. Thereafter, contributions from higher wavenumber features are included. In this manner, spatial resolution and variability in the model is successively increased.

Figure 19:
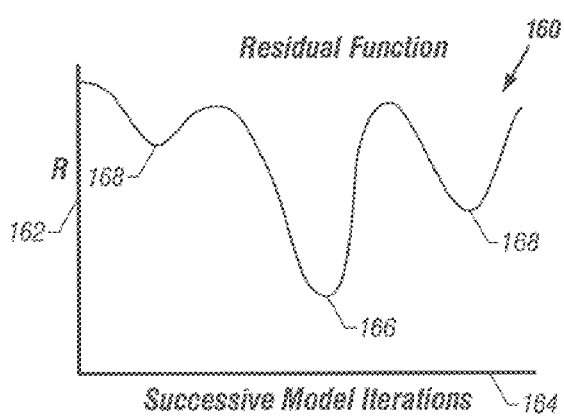
FIG. 19 is a plot of an exemplary residual function illustrating an overall global minimum and local minima.

Attention is now directed to FIG. 19 which illustrates an exemplary residual function for a one-dimensional or one-parameter problem generally indicated by the reference number 160. The residual function, R, is plotted along a vertical axis 162 of the figure against successive model iterations along a horizontal axis 164. Residual function 160 is illustrated at some arbitrary point in the overall inversion process serving to illustrate characteristics of typical residual functions. In particular, residual function 160 includes a global minimum 166. In this regard, the reader is reminded that the objective of the inversion process of FIG. 11 is to minimize the residual function by converging on global minimum 166. However, the residual function locus also includes local minima 168. In attempting to converge on global minimum 166, it is noted that a "frequency limited" approach has been applied, for example, in prior art pixelated models. However, the approach was applied by first using a coarse pixel grid and, thereafter, adding pixels to the grid. For this and other reasons, prior art pixelated models notoriously converged on local minima such as 168 in the absence of near constant user attention during the inversion. While there are a number of inversion approaches that, in principle, allow one to successively incorporate higher spatial frequencies into a tomographic inversion (e.g. a Levenberg-Marquart approach) the prior art does not discuss any specific implementations of an automatic approach to successively incorporate higher wavenumber terms into the inversion process. In view of the prior art, one of ordinary skill in the art would most likely suggest limiting frequency response in the common earth model by beginning the inversion process using only lower order terms of the functions and, thereafter, adding the higher order terms in a manner which is consistent with the prior art pixelized approach. This approach, however, is not considered to be acceptable herein because the truncation or roundoff error introduced by changing the model has undesired effects on convergence. The approach of the present invention, however, operates in an essentially opposite manner, and takes advantage of the polynomial formulation of the model space. Specifically, continuation constraints are applied to the functions with the full variation capability of the functions present. The initial "low frequency" part of the model is then recovered by forcing model variability to be small (forcing the model to be smooth) in the early stages of the inversion process. For a given initial level of constraints forcing model smoothness, it can be determined mathematically when the global minimum has been reached by examining the residual function itself. At this point, the constraints forcing model smoothness are relaxed, allowing the inversion to recover higher frequency components of the model. This process continues until ultimately the constraints forcing model smoothness are negligible and the inversion finds the highest frequency components in the model that are available in the data (the raypaths and arrival times). It has been found that the continuation constraint approach of the present invention almost invariably converges on global minimum 166 in what is considered to be an optimum manner most usually with no user input during the overall inversion process. Traveltime residuals obtained in the continuation constraint approach have typically been two orders of magnitude less than residuals obtained with unconstrained tomography.

In prior art unconstrained tomography, the objective function that is minimized is constructed solely from traveltime errors. With the continuation approach outlined above, it is useful to examine an objective function constructed additionally from the constraints. The function being minimized then has two parts: a part due solely to traveltime misfit, and a part due to how well the current model satisfies the current constraints that force model smoothness. In particular, the objective function is examined in order to determine when to take the next "continuation step" wherein the constraints on the model are reduced. A continuation step is taken when certain termination conditions are met for the current constraints.

The termination conditions for a given fixed value of constraints are determined by examining the objective function that is being minimized: the combination of "data errors" (traveltime residuals) and "penalty errors" (the misfit due to the constraints). There are two termination/stopping conditions that must be met. The first is evidenced by a minimal decrease in the overall objective function. In doing so, successive iterations are compared and the residual itself is examined. When the current iteration produces a residual less than some small fraction of the previous (for example, 0.5%) iteration, the condition is considered as being satisfied. If the previous residual is denoted as "resid_old" and the new or next residual is denoted as "resid_new", this condition can be expressed in the following form:

$$resid\_old - resid\_new < rtol * resid\_old, \qquad (7)$$

where rtol is for example 0.5% or 0.005.

The second stopping condition is concerned with how well the current model parameters and constraints are "solved" in terms of the linear equations. The inversion equations are set up as follows:

$$A\ dp = dt \qquad (8)$$

where A is the matrix of derivatives of traveltime with respect to the model parameters (the coefficients of the Chebyshev polynomials describing slowness), dp is the vector of updates to the current model parameters (changes in the actual coefficients of the Chebyshev polynomials describing slowness), and dt is the vector of traveltime residuals (the "picked" traveltimes minus the traveltimes computed in the forward modeling step from the Common Earth Model). In addition, the quantities: "AdpN", the "norm" of the matrix-vector product A times dp, and dtN, the "norm" of the right-hand-side residual vector dt are utilized. The second stopping condition requires the ratio AdpNh/dtN be less than some tolerance (for example, 0.1). The idea being that if the problem Adp=dt is solved, then the quantity Adp is orthogonal to the quantity (dt−Adp). If the problem Adp=dt is solved to a reasonable approximation, then the matrix-vector product of the derivative matrix A and the solution vector dp should be close to orthogonal to the difference (dt−Adp) of the residual vector dt minus the matrix-vector product Adp. The second stopping condition is expressed as:

$$AdpN/dtN < Ntol, \qquad (9)$$

where Ntol is, for example, 0.1. When both stopping conditions described above are satisfied, the next "continuation step" decreases the constraints, thereby reducing smoothness to continue the inversion process outlined above.

Having provided an understanding of the common earth model and its method of use, it is now appropriate to discuss associated advantages in view thereof In essence, the present invention is thought to sweep aside prior crosswell tomographic techniques for a number of important reasons. For example, the common earth model and associated method of the present invention are formulated in three dimensions. In and by itself, this advantage has not been seen heretofore and may, in fact, not even fall into full appreciation until such time that the present invention is placed into everyday use. However, certain aspects of this advantage have already become evident and are themselves highly advantageous. For instance, considering traveltime tomography from a single pair of boreholes, the present invention accommodates and accounts for arbitrary well geometries, including horizontal and highly deviated wells. It also provides more accurate representation of actual geologic structure, especially out of plane dip and high velocity contrasts. Further, the present invention provides for the simultaneous use of any number of crosswell seismic data profiles which are available for a region of interest. That is, by executing the full method one time, a single, self consistent, model of the overall region of interest is provided which is capable of providing image data with regard to any portion of the region. Moreover, the problem seen in the prior art and discussed above with regard to poor crossline ties between adjacent profiles or tomograms has been eliminated, as will be seen immediately hereinafter.

Figure 20:
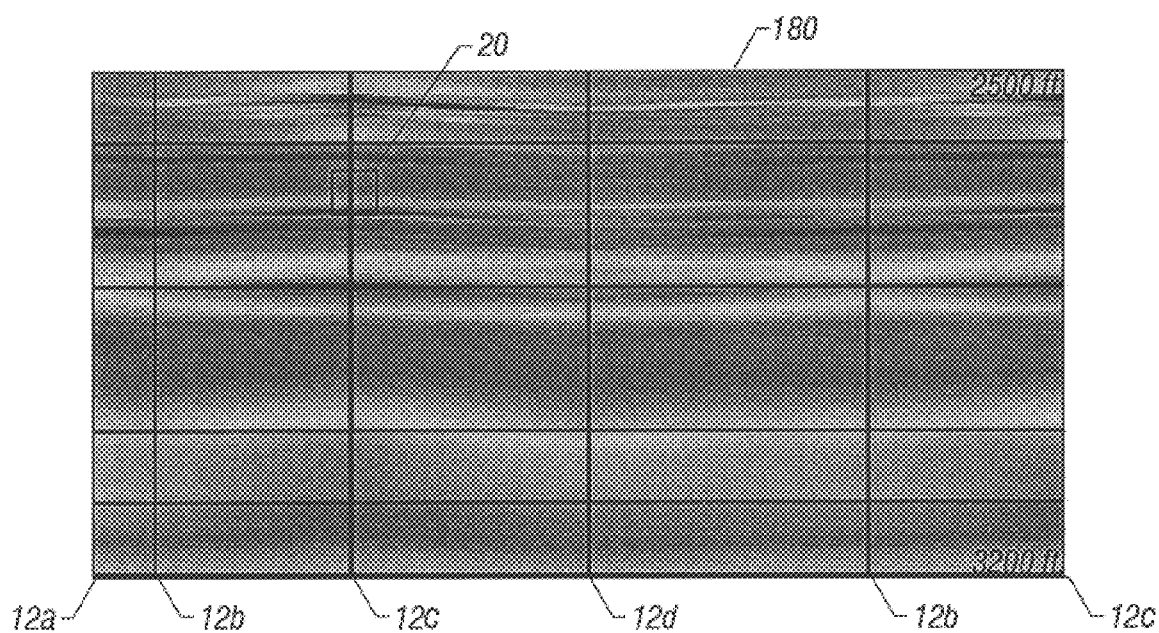
FIG. 20 is a grayscale representation of a tomogram produced from the application of the three-dimensional technique of the present invention, for direct comparison with the prior art tomograms of FIG. 3, wherein the tomogram produced in accordance with the present invention exhibits complete consistency across the extents of the region with no gaps in coverage.

With reference to FIG. 3, described previously, and FIG. 20, a direct comparison of results produced in accordance with the present invention will be made to the prior art tomograms of FIG. 3. The latter illustrates an unwrapped view of region 10 which combines a number of prior art tomograms necessarily generated independently between wells 12a–d. FIG. 20 is a grayscale reproduction of an actual tomogram, indicated by the reference number 180, produced using the common earth model and method of the present invention for region 10 of FIG. 1. For purposes of comparison, FIG. 20 illustrates the same unwrapped view as FIG. 1, however, the view of FIG. 20 is taken through the three dimensional space of the common earth model. In comparing these figures, it should immediately be noted that the common earth model provides a completely uniform, consistent image across its entire extents. That is, the problem of poor ties between adjacent profiles has been eliminated. As a specific example, region 20 is indicated for comparison with its appearance in FIG. 3. In FIG. 3, region 20 is representative of poor ties. With regard to the tomogram of FIG. 20, it should be appreciated that the present invention contemplates presentation of images to a user in any of a number of different visualization formats. That is, the common earth model is thought to be readily adaptable to display presentations either presently available or to be developed. For example, "difference tomograms" which display the difference between velocity images generated at two times (for example before and after a steam injection), generated using the common earth model approach discussed above could be represented in three dimensions with areas of large differences clearly visible and distinguishable in extent. Furthermore, the 3D nature of the common earth model lends itself readily to display of three dimensional movies which incorporate the true nature of deviated wells and complex geology.

Continuing with a comparison of FIGS. 3 and 20, the reader may recall that constrictions in certain wells caused the tomograms of FIG. 3 to exhibit areas 16 and 18 in which no coverage is provided by the tomograms. In contrast, the common earth model and method of the present invention, do not produce such gaps using the same datasets as were used in producing the prior art tomograms. That is, tomogram 180 is entirely consistent across its extents including those regions which previously lacked coverage. This advantage is directly attributable to the three-dimensional formulation of the common earth model in conjunction with the limited parameterization through the polynomial formulation of the surfaces and properties between the surfaces. In and by itself, this advantage represents an important development in the art, however, in conjunction with the ability to provide a uniform image anywhere in a modeled region, a truly remarkable improvement is provided. Still further advantages remain for discussion.

As noted, the common earth model and associated method of the present invention provide for the simultaneous use of a plurality of crosswell seismic data profiles. In fact, the inherent characteristics of the common earth model advantageously permit the simultaneous use of essentially any suitable geologic or geophysical data in conjunction with one or more crosswell profiles. This advantage is initially best understood by considering traveltime tomography using, for example, direct arrival traveltimes. One of ordinary skill in the art will recognize that some number of direct arrival traveltimes result from a particular crosswell seismic profile. Moreover, each traveltime is defined between a source position and a receiver position. The present invention additionally recognizes that, with the provision of the three-dimensional common earth model, there is no need to separately process traveltimes obtained from different profiles. In accordance with the present invention, any traveltime between source and receiver positions in the region of interest is useful, irrespective of which crosswell profile produced that traveltime. Therefore, in a region such as, for example, region 30 of FIG. 4 where a number of crosswell profiles are available, the present invention simultaneously uses all of the direct arrival traveltimes which the profiles yield. Many limitations of prior art tomography are thus eliminated. For example, well deviation is of no concern so long as reasonably accurate source and receiver positions can be located in the region of interest. In fact, highly deviated or completely horizontal wells are considered as advantageous herein since traveltimes produced from such wells result in improved azimuth sampling.

Having initially described the use of direct arrival traveltimes immediately above, it is now appropriate to discuss other types of geologic data which are useful in the present invention. First, it should be recognized by one of ordinary skill in the art that the foregoing model iteration and inversion approach can be used on measured values other than direct arrival traveltime with the stipulation that the raypath is known or previously defined by direct arrival traveltime inversion. Examples of other types of measured values that can be inverted using this approach include amplitude of the direct arrival, center frequency of the direct arrival, bandwidth of the direct arrival and instantaneous phase of the direct arrival. Estimates of earth properties such as attenuation can be obtained by inverting these other measured values. It should also be recognized by one of ordinary skill in the art that raypaths other than the direct arrival between source and receiver can be used in the inversion process. For example, P–S converted, transmitted arrivals could be picked and inverted with this approach. The traveltimes of reflected arrivals from known interfaces could also be used in this approach.

More generally, other types of geologic data can include both seismic and non-seismic data. Electromagnetic data, especially crosswell electromagnetic datasets can be processed by the general method of the common earth model and continuation constraint inversion process described herein, either independently or in conjunction with crosswell seismic data. The crosswell seismic and electromagnetic datasets are differently sensitive to material property variations in the subterranean earth, and can be used jointly to better resolve the imaging of specific earth property fields. In such a case, the common earth model representation of velocity and electrical properties, such as resistivity, could use a single set of common layer boundaries, with each material or data property represented by a separate polynomial within each layer. This is an inherent advantage of the common earth model described herein, in that multiple properties can be assigned and manipulated for each layer simply by establishing a polynomial, or set of polynomials for each property in each layer. For joint seismic and electromagnetic datasets, the model iteration and inversion process of FIG. 11 can be extended to include electromagnetic forward modeling as well as the ray tracing. The inversion process in this case would iterate to minimize a composite residual function corresponding to both electromagnetic data and direct traveltime residual minimization. The model iterations could be computed independently or using a cross coupling of parameters such as seismic velocity variation with resistivity. The specific implementation would depend to a large degree on the confidence with which the characteristic petrophysical properties are known for the specific geological area. However the model representation and inversion method are not restricted in their handling of multiple properties and multiple physics, either independently or in an interlinked form for representation and estimation of geologic structure and material properties. Similarly, additional physics and measurement methods are not restricted to seismic and electromagnetic, and all other practical data types, including but not limited to gravity, magnetic, flow, tracer and pressure transient data as well as geological analogue maybe accommodated within the model and method either as measured and forward modeled data or as constraints or a priori information.

Further, in areas where there is a significant lateral discontinuity in geologic structure, such as at a fault, where there may be an abrupt change in property variation and even possible continuation in another layer, the model representation can be adjusted by using two, or more, polynomial function representations for the value of a given property within a layer, such that a linear combination of two or more polynomial functions determines the value of the property parameter. In the case of a fault like discontinuity, each parameter representative polynomial is each modulated by a further function which is essentially scaled linearly between zero and one throughout the x-y space of the layer such that the linear combination of the two or more polynomial functions determines the value of the parameter on either side of each lateral interface within a model layer.

It has been mentioned previously how other types of data can be used to estimate formation tops, especially other types of seismic data. In a specific refinement of the method, the resulting velocity, or other parameter field, output by the process at the end of the inversion and model iteration process could be used to establish a better starting model and the process could then repeated. For example in the case of a velocity model, the velocity field output by the process could be spatially differentiated to provide estimates of the actual positions of the interfaces between geologic strata which in most cases would be more accurate than the initial interpolations between formation tops estimated at wells or other arbitrary points in space. Accordingly, the layer boundary surfaces could be constructed in a much more geologically conformal manner than would be possible initially without the benefit of the results of the model iteration and inversion. The results of the second model so developed could be reapplied to develop a third, further refined model, and so on. In each case the distribution of the geological or material properties determined by the model could be used to update the layer boundary surfaces for the next version of the model, so ultimately, both the layer surfaces and the properties distribution within the layers converge to better depict the actual distribution of geologic strata and material properties of the subsurface. In such multiple iterations of the overall model process, the use of property information to update the layer boundaries is not restricted to a single property; multiple properties could be used conjunctly, or sequentially in different iterations.

The common earth model introduced above is well-suited also to crosswell reflection imaging. Generally, the first step in reflection imaging is to generate accurate velocity information for the survey area. The invention described above functions in this regard and can be considered a critical step in achieving practical 3D reflectance imaging from crosswell data. Following the construction of a velocity model from the tomography process, the same common earth model and ray-bending framework described above can be used for reflection raytracing. Reflection raytracing generates "trajectories" for a set of subsurface locations of reflection points associated with a single source-receiver pair and all of the model surfaces illustrated, for example, in FIG. 10. That is, the location on each of the model surfaces of the reflection point is found that minimizes the arrival time for the overall raypath through the current velocity model. One significant improvement of this invention compared to the prior art 2D models resides in the fact that reflections due to dipping reflectors will be accurately positioned in 3D. In prior art crosswell reflection raytracing methods, the assumption of no out-of-plane dip forces all reflection events to be located in the plane of the wells. However, for stratigraphic beds having geologic structure with out-of-plane dips, the true reflection location may be significantly away from the plane of the wells.

With reflection trajectories calculated through an accurate velocity model, it is possible to "map" time to depth. In this process, reflected seismic signals generated for a known combination of source and receiver geometry can be located accurately in the 3D model. The data-dependant required information for mapping is the source-receiver geometry and the arrival times of the reflected energy. The reflection trajectories described above, together with the reflection times calculated with the trajectories, illustrate the path of reflection energy. Finally, for a given source-receiver pair and signal time, we can locate from the trajectories, velocity model and reflection times the subsurface location giving rise to the reflection. The results of reflectance imaging could be used as a basis for updating the layer boundary surface starting model for another iteration of the process as described above.

Two other particular aspects of other seismic data used bear special mention. High resolution processing of surface seismic, such as acoustic impedance inversion can be used to estimate properties and strata boundaries on a sub-wavelength scale. The results of this type of processing can be incorporated into the method to provided detailed estimations of formation tops, especially where well data is not available, and also as an initial starting model and constraints for properties inversion. Another form of seismic data of special interest is that of single well seismic imaging. This is a particular extension of crosswell seismic in which the source and receiver are located the same borehole. Single well seismic imaging is a relatively immature method and poses significant challenges in data acquisition. However the imaging objectives are generally similar to that of conventional crosswell seismic, and typically velocity tomography and reflectance imaging methods are applied. Conventional processing is generally limited for single well seismic imaging because conventional vertical well, planar geometry representation are of little practical meaning when applied to single well dataset geometries. However, the common earth model representation is entirely valid and appropriate to single well seismic imaging, as is the ray-bending method for velocity tomography.

As noted above, principal prior art methods utilize iterative backprojection through a slowness model, and therefore are subject to the constraints and limitations of the crosswell aperture. In contrast, the present invention utilizes approximations to a layered earth through polynomial surfaces and velocity fields so as to circumvent these limitations, providing much higher vertical resolution than could be practically expected out of any of the conventional traveltime tomography techniques, especially when applied to realistic three dimensional earth models. Therefore, the present invention is considered to be completely set apart and distinct from any of the principal prior art techniques and provides significant resolution and computational advantages when compared to any presently known form of crosswell traveltime tomography.

Moreover, the approach of the present invention which serves to gain resolution while obtaining a multi-well consistent 3-D result relies on parameterizing surfaces and the velocity fields defined as layers between these surfaces as Chebychev polynomials. This affords highly effective means for computing Frechet derivatives and for forward modeling through the earth model using a ray-bending method. In contrast, Guiziou, et al, (1996) use a parameterization of a velocity field having a linear gradient between surfaces and fits the lateral variation in velocity with B-splines. In fact, the actual surfaces used by Guiziou are arbitrary and are not polynomials. Guiziou uses this parameterization because it deals with tomographic inversion of reflection data obtained from a surface seismic geometry. Were the Guiziou approach used herein for crosswell traveltime tomography, the functionality achieved herein could not be realized, because such surfaces would not accommodate the use of a ray-bending technique and the Frechet derivatives would be far more complex to compute. In addition, there is no justification for assigning arbitrary surfaces, as described by Guiziou, because in crosswell imaging information is typically to hand with regard to the surfaces concentrated at certain points, such as at the wells, whereas, in principle, Guiziou has information about the surfaces distributed everywhere throughout his 3-D model. Therefore, because the common earth model parameterizes the surfaces as well as the velocity field, and applies to crosswell rather than surface seismic data, it is distinct, and offers far reaching advantages over the method proposed by Guiziou.

With brief regard to the prior art approach taken by Chiu and Stewart, 1987. The parameterization of surfaces is discussed as either polynomials or as sinusoidal functions, however this art does not teach the parameterization of the velocity field as a first-order or higher polynomial. Rather, Chiu and Stewart treat the velocity field between the surfaces as constant. Parameterization of the common earth model in such a manner would be inconsistent with incorporation of realistic lateral heterogeneity in a computationally efficient way.

Thus, in view of the foregoing, the present invention is set apart from the prior art in its use of (1) Chebychev polynomial representation of both surfaces and layer parameters in general traveltime tomography, (2) raybending computation and analytic derivative computation in conjunction with Chebychev representation in general traveltime tomography and (3) use of polynomial surfaces and polynomial property fields in crosswell direct arrival traveltime tomography and imaging. These distinctions have beneficial implications in the implementation of crosswell seismic imaging including traveltime tomography and further extend to the application to reflectance imaging and other advanced methods, as described above.

It should be appreciated that the concepts of the present invention, as used in the method taught herein and in the highly advantageous common earth model, may be applied in a number of different ways by one of skill in the art. Therefore, the present examples and methods are considered as illustrative and not restrictive, and the invention is not to be limited to the details given herein, but may be modified within the scope of the appended claims.

What is claimed is:

1. In a method of characterizing a specific numerical value of a particular proper at any position within a subterranean region of ground encompassing at least one borehole from which seismic data relating to said property is at least in part generated, the improvement comprising the step of:

representing the value of said particular property as determined by said seismic data across said region using at least one continuous analytic function.

2. The improvement of claim 1 wherein said continuous analytic function is a polynomial.

3. The improvement of claim 2 wherein said polynomial is a Chebychev polynomial.

4. The improvement of claim 1 wherein said continuous analytic function is differentiable.

5. The improvement of claim 1 wherein said subterranean region includes horizontal extents and wherein said continuous analytic function defines the value of said property throughout the horizontal extents of said subterranean region.

6. The improvement of claim 1 wherein said property is velocity.

7. The improvement of claim 1 wherein said property is attenuation.

8. The improvement of claim 1 wherein said property is impedance.

9. The improvement of claim 1 wherein said seismic data includes at least one cross-well seismic data profile and wherein the value of said property is determined using said cross-well seismic data profile.

10. The improvement of claim 1 wherein said seismic data includes data obtained from a single borehole and wherein the value of said property is determined using said single borehole data.

11. In a method of mapping a specific numerical value of a particular property at any position within a subterranean region of ground surrounding at least two boreholes where at least a first crosswell seismic data profile has been generated between a pair of two boreholes and wherein other data may also be available, the improvement comprising the step of:

simultaneously using certain portions of said first crosswell seismic data profile and said other data to establish the value of said property throughout said subterranean region.

12. The improvement of claim 11 wherein said other data includes borehole geophysical data and wherein said borehole geophysical data is used simultaneously with said portions of the first crosswell seismic data profile.

13. The improvement of claim 11 wherein said other data includes a second cross-well seismic data profile generated between a different pair of boreholes encompassed by said region and wherein the second cross-well seismic data profile is used simultaneously with said first cross-well seismic data profile to determine the value of said property.

14. The improvement of claim 13 wherein the simultaneous use of said first and second crosswell seismic data profiles includes the step of establishing the value of said property surrounding said boreholes in three dimensions.

15. The improvement of claim 11 wherein said other data includes seismic data obtained using one, particular borehole and wherein the first cross-well seismic data profile is used simultaneously with the particular bore-hole obtained seismic data to establish the value of said property.

16. The improvement of claim 15 wherein said particular borehole is not one of said pair of boreholes.

17. The improvement of claim 15 wherein said particular borehole is one of the boreholes which make up said pair of boreholes.

18. The improvement of claim 15 wherein at least one particular borehole us ed to generate at least a portion of the seismic data is generated over a part of said particular borehole having a high deviation from a vertical direction.

19. The improvement of claim 18 wherein said high deviation is at least thirty degrees from said vertical direction.

20. The improvement of claim 11 wherein said certain portions of said first crosswell seismic data profile includes direct arrival traveltimes which are obtained from the crosswell seismic data profile.

21. The improvement of claim 11 wherein said certain portions of said first crosswell seismic data profile include reflected arrival traveltimes which are obtained from the crosswell seismic data profile.

22. The improvement of claim 11 wherein said certain portions of said first crosswell seismic data profile include P to S and S to P converted arrival traveltimes times which are obtained from the crosswell seismic data profile.

23. The improvement of claim 11 wherein said certain portions of said first crosswell seismic data profile include direct arrival amplitudes which are obtained from the crosswell seismic data profile.

24. The improvement of claim 11 wherein said certain portions of said first crosswell seismic data profile include direct arrival instantaneous frequencies which are obtained from the crosswell seismic data profile.

25. The improvement of claim 11 wherein said certain portions of said first crosswell seismic data profile include reflected arrival amplitudes obtained from the crosswell seismic data profile.

26. The improvement of claim 11 wherein said certain portions of said first crosswell seismic data profile include reflected arrival instantaneous frequencies obtained from the crosswell seismic data.

27. The improvement of claim 11 wherein said certain portions of said first crosswell seismic data profile include converted arrival amplitudes obtained from the crosswell seismic data profile.

28. The improvement of claim 11 wherein said certain portions of said first crosswell seismic data profile include converted arrival instantaneous frequencies obtained from the crosswell seismic data.

29. The improvement of claim 11 wherein said particular property is velocity.

30. The improvement of claim 11 wherein said particular property is attenuation.

31. The improvement of claim 11 wherein said particular property is impedance.

32. A method of establishing a specific numerical value of a particular property at any position within a subterranean region of ground encompassing at least two boreholes from which at least one crosswell seismic data profile is generated relating to said particular property, said method comprising the steps of:
  a) fitting a set of vertically spaced layer boundaries within and across said region encompassing said boreholes in a predetermined way such that a series of layers is defined between the layer boundaries;
  b) establishing initial values of said particular property between said layer boundaries and across said subterranean region using a series of continuous analytic functions, at least one of which corresponds to each one of said series of layers; and
  c) using said crosswell seismic profile or profiles, adjusting said continuous analytic functions to more closely match the value of said particular property across said subterranean region of ground such that the value of said particular property is determined for any selected point within said subterranean region.

33. The method of claim 32 wherein said initial values of said property are initially established as a constant throughout said subterranean region.

34. The method of claim 32 wherein said subterranean region includes generally horizontally extending strata defining generally horizontally extending strata boundaries across the region and wherein said vertically spaced layer boundaries are fitted in a way which causes the layer boundaries to extend generally horizontally across said region in general conformance to said strata boundaries.

35. The method of claim 34 wherein only one of said continuous analytic functions corresponds to each one of said layers.

36. The method of claim 32 wherein said subterranean region includes at least one strata region having a geologic discontinuity and wherein a number of said vertically spaced layer boundaries corresponding to a subset of said layers intersect said geologic discontinuity, said step of establishing a series of continuous analytic functions including the step of establishing a different one of the analytic functions on each side of said geologic discontinuity for each layer of said subset of layers which intersect said geologic discontinuity.

37. The method of claim 32 wherein said particular property is velocity.

38. The method of claim 32 wherein said property is attenuation.

39. The method of claim 32 wherein said property is impedance.

40. The method of claim 32 wherein said continuous analytic functions are polynomials, each of which includes a predetermined number of coefficients having magnitudes which are used to define the value of said particular property across said subterranean region of ground which magnitudes are changed in said adjusting step to more closely match the value of the particular property.

41. The method of claim 40 wherein said step of adjusting the continuous analytic functions utilizes a number of direct arrival traveltimes which form one portion of said seismic data profile and wherein an overall number of coefficients from all of said layers is less than or equal to the number of said direct arrival traveltimes.

42. The method of claim 40 wherein said step of adjusting the continuous analytic functions uses a number of reflected arrival traveltimes which form one portion of said seismic data profile.

43. The method of claim 40 wherein said step of adjusting the continuous analytic functions uses a number of P to S and S to P converted arrival traveltimes which are obtained from the crosswell seismic data profile.

44. The method of claim 40 wherein said step of adjusting the continuous analytic functions uses a number of direct arrival amplitudes which are obtained from the crosswell seismic data profile.

45. The method of claim 40 wherein said step of adjusting the continuous analytic functions includes using direct arrival instantaneous frequency data which is obtained from the crosswell seismic data.

46. The method of claim 40 wherein said step of adjusting the continuous analytic functions includes using reflected arrival amplitudes obtained from the crosswell seismic data.

47. The method of claim 40 wherein said step of adjusting the continuous analytic functions includes using reflected arrival instantaneous frequencies obtained from the crosswell seismic data.

48. The method of claim 40 wherein said step of adjusting the continuous analytic functions includes using converted arrival amplitudes obtained from the crosswell seismic data.

49. The method of claim 40 wherein said step of adjusting the continuous analytic functions includes using converted arrival instantaneous frequencies obtained from the crosswell seismic data.

50. The method of claim 40 wherein said coefficients are cooperatively capable of defining frequency variation of the value of said particular property across said subterranean region for each layer such that the frequency variation includes both relatively high and relatively low frequency content and wherein said adjusting step adjusts the magnitudes of said coefficients in a way which uses a set of constraints to constrain frequency variation of said particular property across said region for each layer to a selected frequency content.

51. The method of claim 50 wherein said step of adjusting said continuous analytic functions includes the step of iteratively changing said set of constraints by changing the magnitudes of said coefficients in a way which progressively adjusts the frequency variation of said particular property across said region content in a user-specified manner.

52. The method of claim 40 wherein said polynomials are Chebychev polynomials.

53. The method of claim 52 wherein each Chebychev polynomial includes ten coefficients which cooperatively define the value of said particular property across said subterranean region for each layer and wherein said step of adjusting the continuous analytical functions adjusts the values of said coefficients.

54. The method of claim 32 wherein said continuous analytic functions are polynomials characterized by coefficients and said crosswell seismic profile includes measured direct arrival traveltimes and wherein said step of adjusting said continuous analytic functions includes the steps of (i)

executing a forward modeling step in a way which produces calculated traveltimes, (ii) comparing said measured direct arrival traveltimes with the calculated traveltimes so as to produce a residual function which represents a difference between the measured direct arrival traveltimes and the calculated traveltimes and (ii) performing an inversion step which adjusts the coefficients of said polynomials.

55. The method of claim 54 where said coefficients of said polynomials are adjusted in a way which minimizes said residual function.

56. The method of claim 32 wherein said continuous analytic functions are polynomials and said crosswell seismic profile includes measured direct arrival traveltimes and wherein said step of adjusting said continuous analytic functions includes the steps of (i) performing a forward modeling step using a plurality of raypaths in a way which produces calculated traveltimes (ii) comparing said measured direct arrival traveltimes with the calculated traveltimes so as to produce a residual function which represents a difference between the measured direct arrival traveltimes and the calculated traveltimes and (iii) executing an inversion step which adjusts the coefficients of said polynomials.

57. The method of claim 56 wherein said forward modeling step includes the step of establishing a source position and a receiver position for a particular value derived from said seismic data so as to define a straight raypath between the source position and the receiver position and, thereafter, perturbing said straight raypath while holding said source and receiver position fixed in a way which results in establishing a direct raypath between said source and receiver position which satisfies Snell's law for said particular value at least to an approximation.

58. The method of claim 57 wherein said forward modeling step further includes the step of taking a series of derivatives along a selected length of said straight raypath from said source position to said receiver position by using said continuous analytic functions such that said derivatives are analytically determined for use in perturbing the straight raypath.

59. The method of claim 56 wherein steps (i), (ii) and (iii) are repeated in a iterative manner until such time that said residual function is reduced in one iteration by less than a predetermined minimum amount.

60. The method of claim 54 wherein said forward modeling step includes the step of establishing a source position and a receiver position for a particular value derived from said seismic data so as to define a reflection path between the source position and the receiver position and, thereafter, perturbing said reflection path while holding said source and receiver position fixed in a way which results in establishing a more accurate raypath between said source and receiver position which satisfies Snell's law for said particular value at least to an approximation.

61. The method of claim 32 wherein said analytic functions are differentiable.

62. The method of claim 32 wherein said subterranean region includes at least three boreholes providing two or more crosswell seismic data profiles generated between two or more different pairs of the boreholes and wherein said step of adjusting said continuous analytic functions includes the step of simultaneously using certain portions of all of said crosswell seismic data profiles to determine the value of said property throughout said subterranean region.

63. The method of claim 62 wherein said step of simultaneously using all of the crosswell seismic data profiles includes the step of establishing the value of said property surrounding said boreholes in three dimensions.

64. The method of claim 62 wherein said certain portions of said crosswell seismic data profiles include direct arrival traveltimes separated from the crosswell seismic data profiles.

65. The method of claim 64 wherein said step of simultaneously using all of the crosswell seismic data profiles includes the step of establishing the value of said property surrounding said boreholes in three dimensions.

66. The method of claim 62 wherein said step of adjusting the continuous analytic functions uses a number of reflected arrival traveltimes which form one portion of said seismic data profiles.

67. The method of claim 62 wherein said step of adjusting the continuous analytic functions uses a number of P to S and S to P converted arrival traveltimes which are obtained from the crosswell seismic data profiles.

68. The method of claim 62 wherein said step of adjusting the continuous analytic functions uses a number of direct arrival amplitudes which are obtained from the crosswell seismic data profiles.

69. The method of claim 62 wherein said step of adjusting the continuous analytic functions includes using direct arrival instantaneous frequency data which is obtained from the crosswell seismic data profiles.

70. The method of claim 62 wherein said step of adjusting the continuous analytic functions includes using reflected arrival amplitudes obtained from the crosswell seismic data.

71. The method of claim 62 wherein said step of adjusting the continuous analytic functions includes using reflected arrival instantaneous frequencies obtained from the crosswell seismic data.

72. The method of claim 62 wherein said step of adjusting the continuous analytic functions includes using converted arrival amplitudes obtained from the crosswell seismic data.

73. The method of claim 62 wherein said step of adjusting the continuous analytic functions includes using converted arrival instantaneous frequencies obtained from the crosswell seismic data.

74. The method of claim 63 wherein at least one particular borehole used to generate at least a portion of the seismic data includes a high deviation from a vertical direction.

75. The method of claim 74 wherein said high deviation is at least thirty degrees from said vertical direction.

76. The method of claim 32 wherein said vertically spaced layer boundaries are established by fitting each said boundary so as to extend through a particular set of locations within said region.

77. The method of claim 76 wherein said particular set of locations for each layer at least includes intersection locations of the layer with at least certain ones of the boreholes.

78. The method of claim 77 wherein said particular set of locations is at least in part determined using well logs.

79. The method of claim 76 wherein said particular set of locations for at least one layer includes at least one specific location at a position away from said boreholes for which specific location certain geologic data is known.

80. The method of claim 79 wherein said certain geologic data is indicative of a strata boundary at said specific location.

81. The method of claim 76 further comprising the step of:
 d) performing a procedure to establish a new particular set of locations for each layer boundary based on the adjustment of said particular property and, thereafter, readjusting said continuous analytic functions using said new particular set of locations to still more closely match the value of said property across the subterranean region of ground.

82. The method of claim 81 including the step of repeating step (d) in an iterative manner until such time that the continuous analytic functions are changed by less than a predetermined amount as compared with the previous iteration.

83. The method of claim 32 wherein well logs are available for said boreholes and wherein said step of fitting said set of layer boundaries includes the steps of (i) establishing an intersection point of each layer with at least certain ones of said boreholes using said well logs and (ii) based on the borehole intersection points common to each layer, establishing each layer boundary extending across said subterranean region so as to extend through the common intersection points.

84. The method of claim 83 wherein said step of fitting said layer boundaries further includes the step of establishing an intersection location of at least one layer with a specific location away from said boreholes at which specific location certain geologic data is known or can at least be estimated.

85. The method of claim 83 wherein said certain geologic data is indicative of a strata boundary at said specific location within the subterranean region.

86. The method of claim 83 wherein said layer boundaries are fitted and established using another series of continuous analytic functions, one of which corresponds to each layer boundary.

87. The method of claim 86 wherein the other series of continuous analytic functions includes Chebychev polynomials including coefficients having magnitudes which are used to establish the intersection points of the boundary layers with the boreholes.

88. The method of claim 83 wherein said well logs serve to identify a series of distinguishable formation tops common to each of said boreholes at different possible depths across the subterranean region and wherein said intersection points are selected for a particular one of said layer boundaries in correspondence with the series of formation tops so as to extend through the same distinguishable formation top at each of said boreholes.

89. The method of claim 32 wherein said layer boundaries are defined using other continuous analytic functions.

90. The method of claim 89 wherein said other continuous analytic functions are Chebychev polynomials.

91. The method of claim 32 wherein an orthogonal coordinate system is established within said subterranean region including horizontal x and y axes and a vertical z axis and a ray segment terminates at a first point $x_1$, $y_1$ at depth $z_1$ on a first layer boundary and terminates at a second point $x_2$, $y_2$ at depth $z_2$ on a second, adjacent layer boundary such that the segment extends through one of said layers between the first and second points and wherein the slowness for said ray segment between the first and second points is given by the expression $$S(x,y)=C_0+C_1x+C_2y+C_3xy+C_4(2x^2-1)+C_5(2y^2-1)+C_6(2x^2-1)y+C_7(2y^2-1)x+C_8(4x^3-3x)+C_9(4y^3-3y)$$

where $S(x,y)$ is slowness as a function of x and y and $C_0$ through $C_9$ are Chebychev polynomial coefficients.

92. The method of claim 11 wherein the value of said particular property at any particular position is determined across said region using at least one continuous analytic function.

* * * * *